US009652460B1

(12) United States Patent
Barisic et al.

(10) Patent No.: US 9,652,460 B1
(45) Date of Patent: May 16, 2017

(54) MOBILE MEDIA INFORMATION CAPTURE AND MANAGEMENT METHODS AND SYSTEMS

(71) Applicant: FotoIN Mobile Corporation, Atlanta, GA (US)

(72) Inventors: Silvije Barisic, Atlanta, GA (US); Danielle Barisic, Atlanta, GA (US); Ivan Klaric, Samobor (HR); Domagoj Trsan, Zagreb (HR)

(73) Assignee: FotoIN Mobile Corporation, Atlanta, GA (US)

( * ) Notice: Subject to any disclaimer, the term of this patent is extended or adjusted under 35 U.S.C. 154(b) by 9 days.

(21) Appl. No.: 14/275,427

(22) Filed: May 12, 2014

Related U.S. Application Data

(60) Provisional application No. 61/822,055, filed on May 10, 2013.

(51) Int. Cl.
*G06F 17/30* (2006.01)

(52) U.S. Cl.
CPC .. *G06F 17/30038* (2013.01); *G06F 17/30545* (2013.01)

(58) Field of Classification Search
CPC .................................................. G06F 17/3012
USPC ................................ 707/705, 758, 769, 770
See application file for complete search history.

(56) References Cited

U.S. PATENT DOCUMENTS

| | | | |
|---|---|---|---|
| 7,954,049 B2 | 5/2011 | Fletcher et al. | |
| 8,310,533 B2 | 11/2012 | Morse et al. | |
| 8,359,314 B2 | 1/2013 | Svendsen | |
| 8,370,358 B2 | 2/2013 | Lin et al. | |
| 8,396,280 B2 | 3/2013 | Amidi | |
| 8,438,131 B2 | 5/2013 | Prorock et al. | |
| 9,171,016 B2 * | 10/2015 | Inoue | H04N 21/458 |
| 2004/0017390 A1 | 1/2004 | Knowlton et al. | |
| 2005/0034057 A1 * | 2/2005 | Hull | G06F 17/212 715/202 |
| 2007/0033516 A1 * | 2/2007 | Khosla | H04L 67/26 715/205 |

(Continued)

OTHER PUBLICATIONS

Daniela Kolarova et al., "An Annotea-Based Approach for Multimedia Data Integration and Semantic Annotation Services in the SINUS Platform," Bulgarian Academy of Sciences, Cybernetics and Information Technologies, 2010, pp. 13-24, vol. 10 No. 1, Sophia, 2010.

(Continued)

*Primary Examiner* — Scott A Waldron
*Assistant Examiner* — Matthew Ellis
(74) *Attorney, Agent, or Firm* — Morris, Manning & Martin, LLP; Daniel E. Sineway, Esq.; Bryan D. Stewart, Esq.

(57) ABSTRACT

Aspects of the present disclosure generally relate to systems and methods of capturing electronic media files, tagging and annotating said electronic media files, capturing associated information (e.g., time and place information), embedding the captured information, tags, and annotations as metadata into the media file, automatically transferring and routing media files with embedded metadata into specific electronic destination(s) like electronic folders or databases, and managing the transfer and organization of the captured files with embedded metadata on backend systems, storage repositories, or other management systems.

18 Claims, 27 Drawing Sheets

Exemplary *UploadMediaMetadata* Operation Flowchart

(56) References Cited

U.S. PATENT DOCUMENTS

| | | | |
|---|---|---|---|
| 2007/0282907 A1* | 12/2007 | Chambers | 707/104.1 |
| 2008/0104099 A1 | 5/2008 | Walczak et al. | |
| 2010/0153168 A1 | 6/2010 | York et al. | |
| 2010/0198824 A1 | 8/2010 | Tsubaki | |
| 2011/0047517 A1 | 2/2011 | Lee et al. | |
| 2011/0055218 A1* | 3/2011 | Capuozzo et al. | 707/741 |
| 2011/0283242 A1* | 11/2011 | Chew et al. | 715/863 |
| 2012/0147216 A1* | 6/2012 | Tysowski | 348/231.3 |
| 2012/0304247 A1* | 11/2012 | Badger et al. | 726/1 |
| 2013/0007043 A1 | 1/2013 | Phillips et al. | |
| 2013/0138438 A1 | 5/2013 | Bachtiger et al. | |
| 2013/0254850 A1* | 9/2013 | Alison et al. | 726/4 |
| 2013/0268491 A1* | 10/2013 | Chung et al. | 707/634 |

OTHER PUBLICATIONS

Jim Gemmell et al., "MyLifeBits: A Personal Database for Everything," Communications of the ACM, Jan. 2006, pp. 88-95, vol. 49 No. 1, Microsoft Research, 2006.

Risto Sarvas et al., "Metadata Creation System for Mobile Images," MobiSys '04 Proceedings of the $2^{nd}$ International Conference on Mobile Systems, Applications, and Services, Jun. 6-9, 2004, 13 pages, ACM, 2004.

* cited by examiner

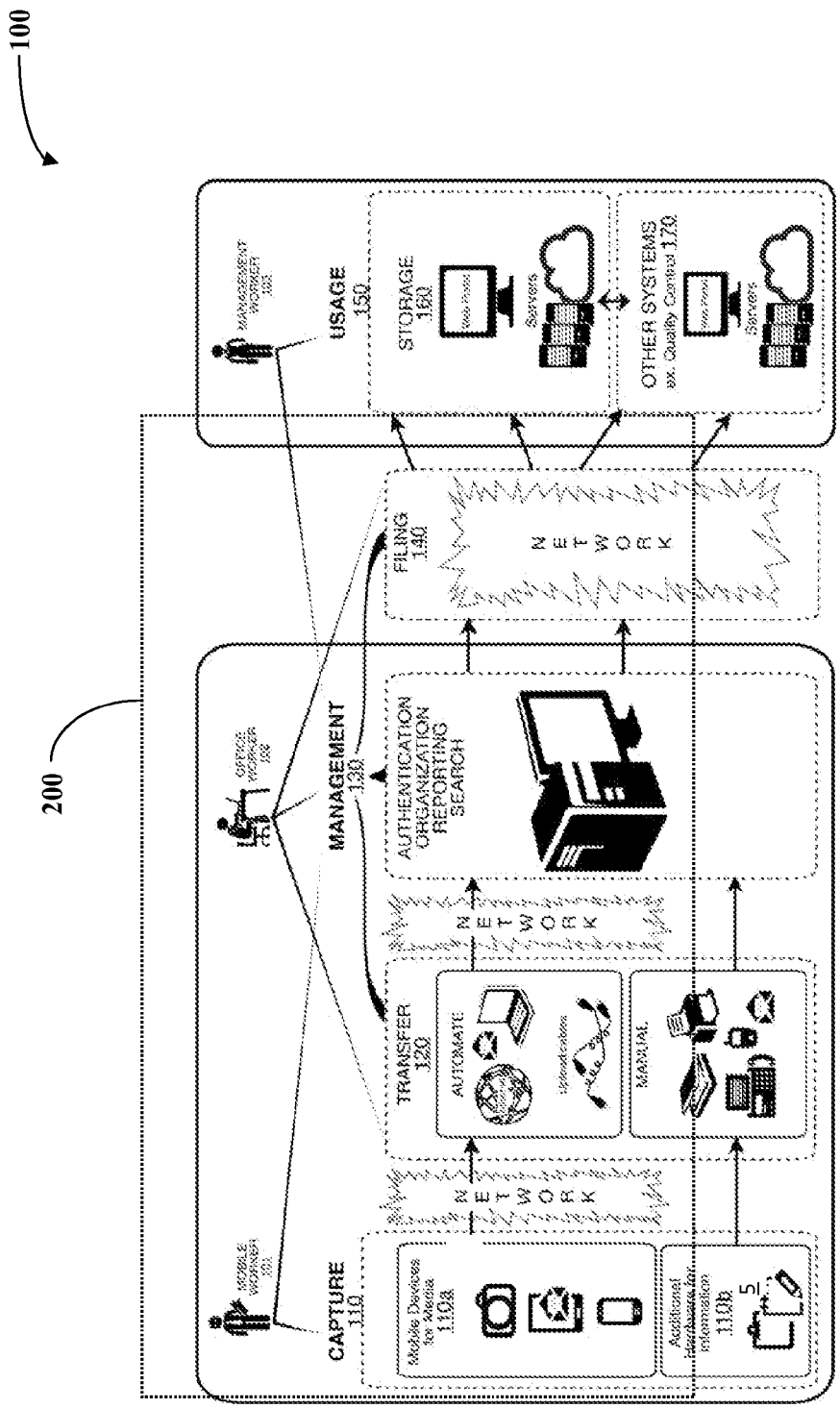
FIG. 1 – Exemplary Overview of a Media and Information Capture and Management System Environment

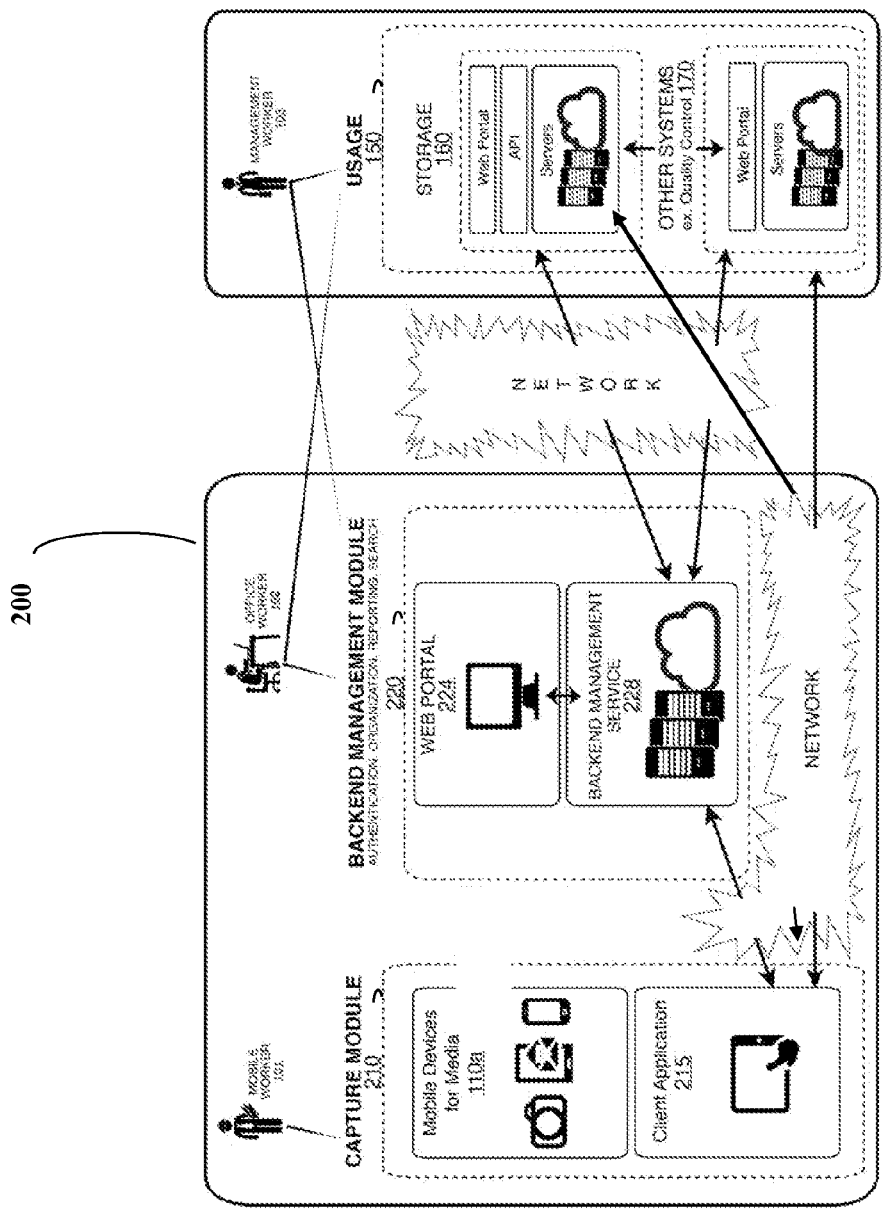
FIG. 2A – Exemplary Architecture of a Mobile Media and Information Capture and Management System

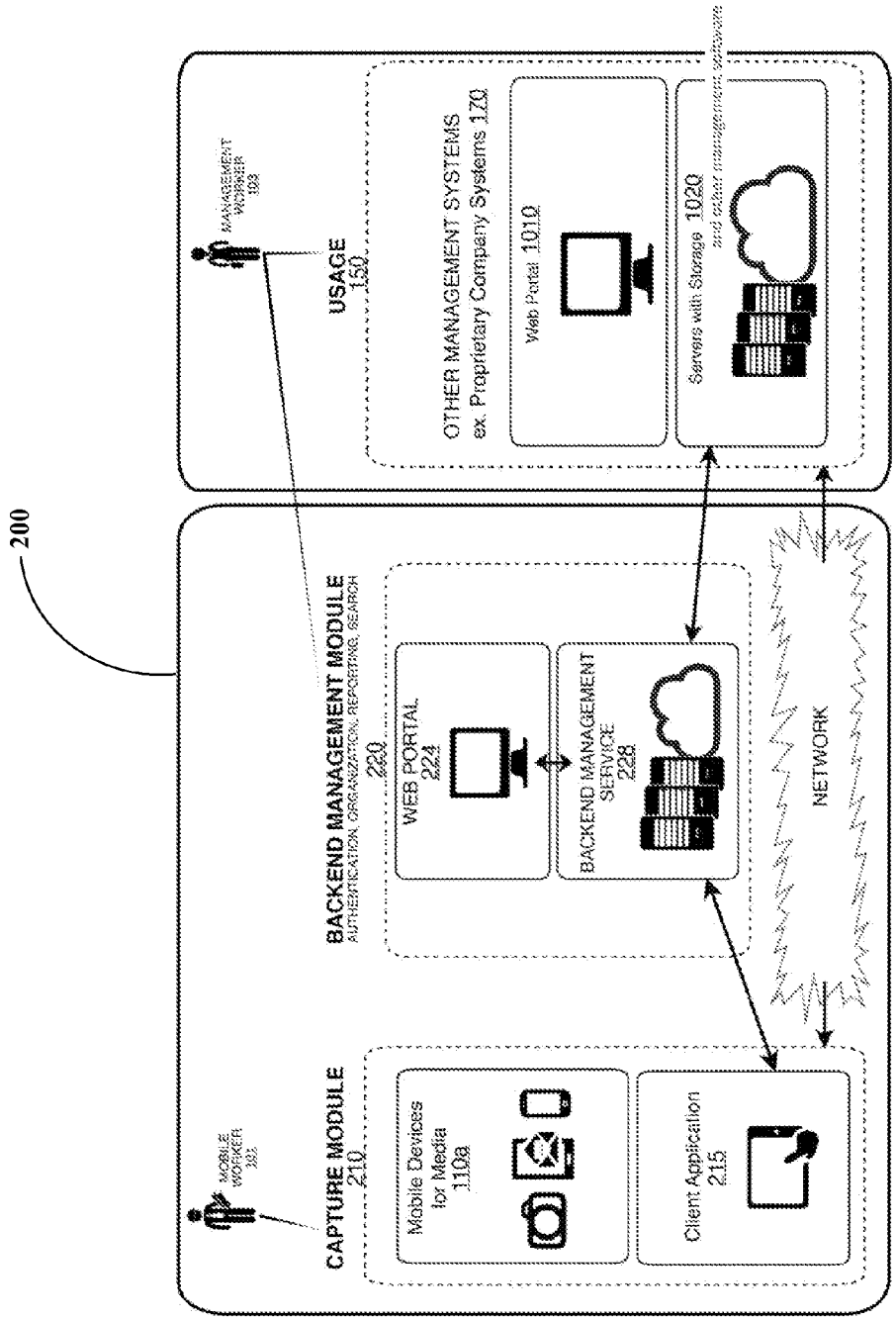
FIG. 2B – Second Exemplary Architecture of the Mobile Media and Information Capture and Management System

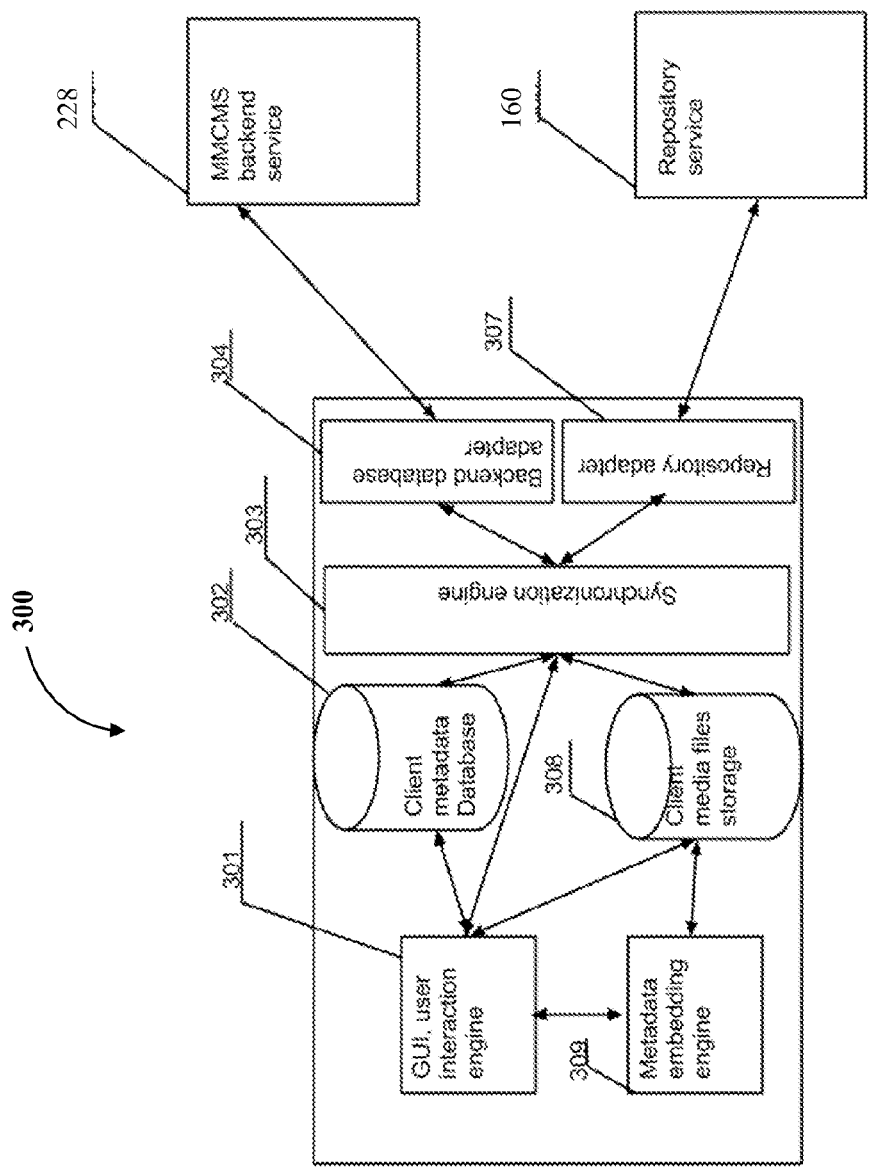
FIG. 3 – Exemplary Client Application Architecture

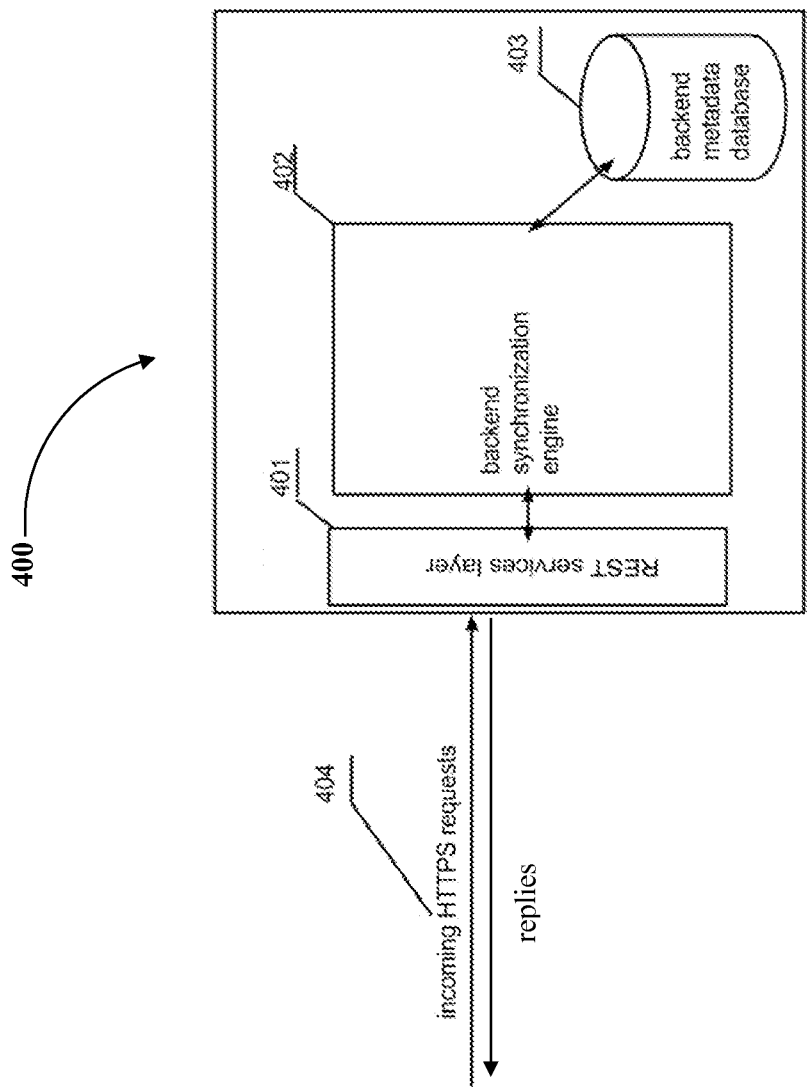
FIG. 4 – Exemplary Backend Management Service Architecture

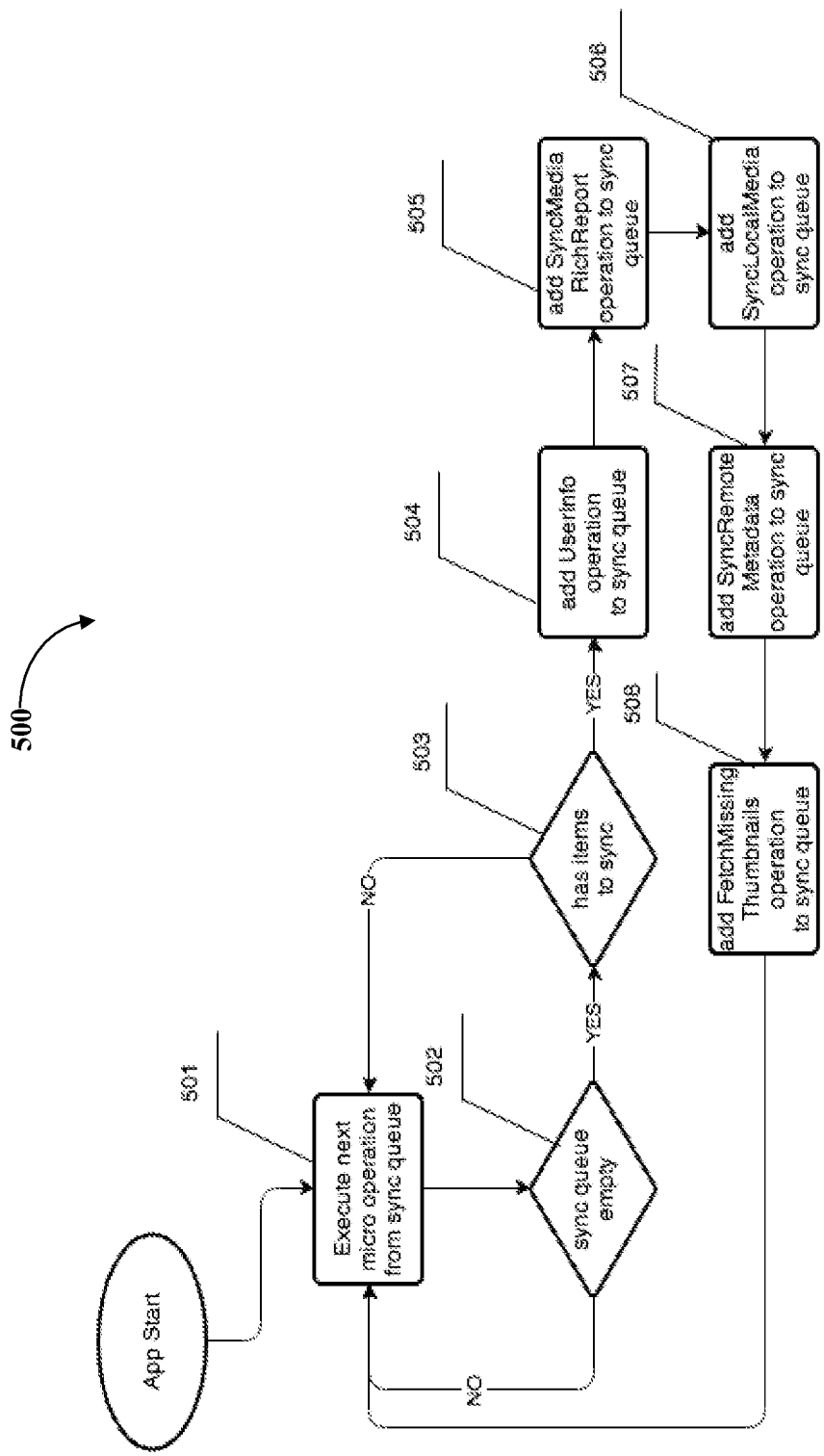
FIG. 5A – Exemplary Synchronization Process Flowchart

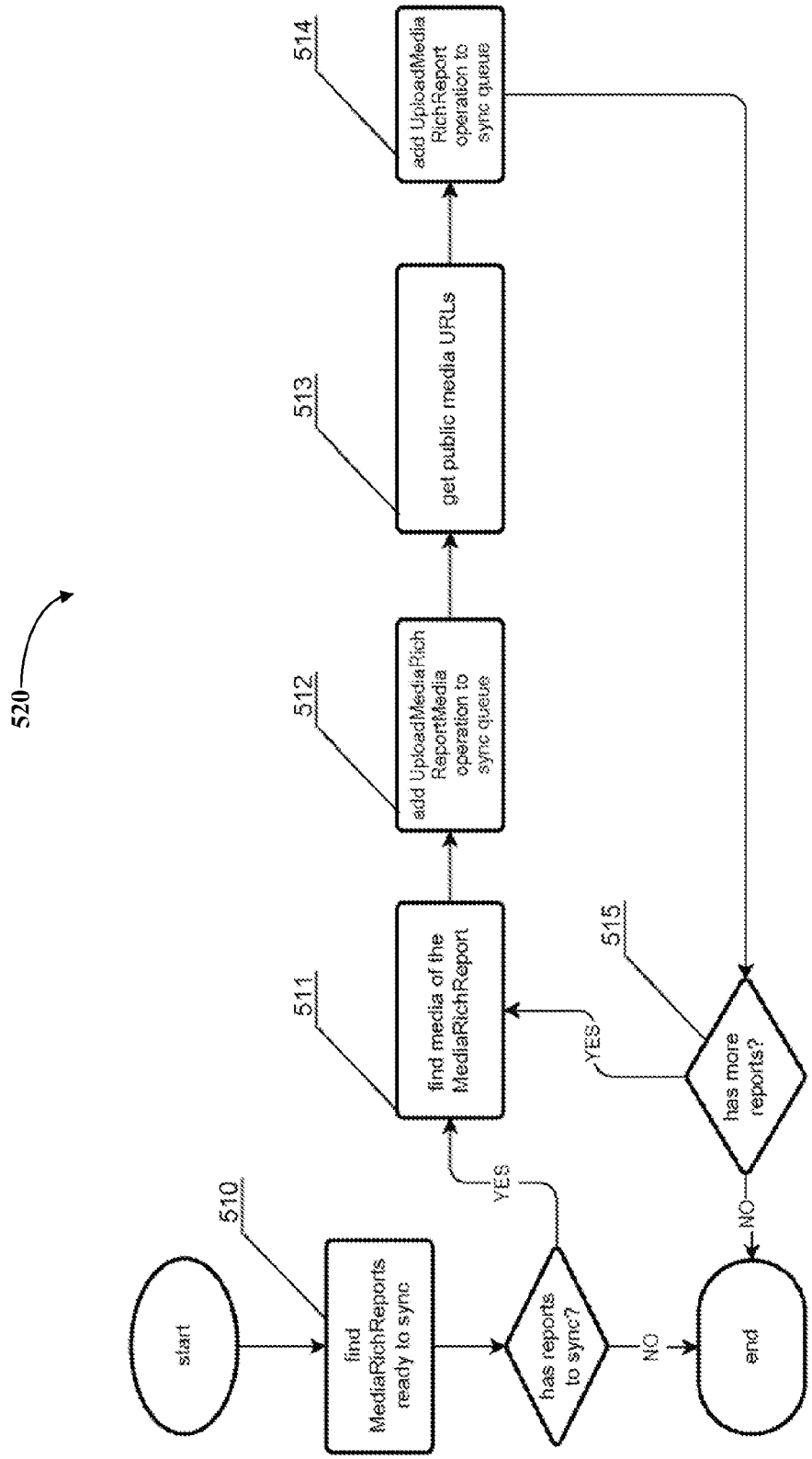
FIG. 5B – Exemplary *SyncMediaRichReport* Operation Flowchart

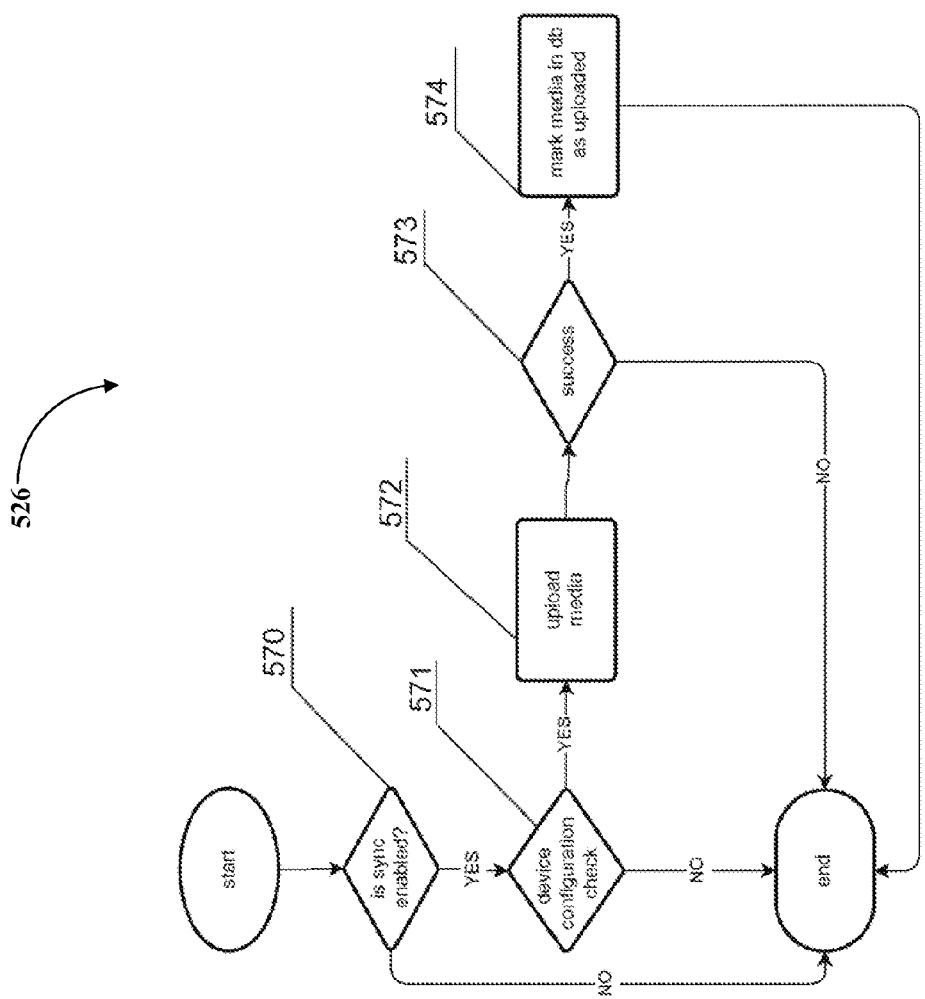
FIG. 5C – Exemplary *UploadMediaRichReportMedia* Operation Flowchart

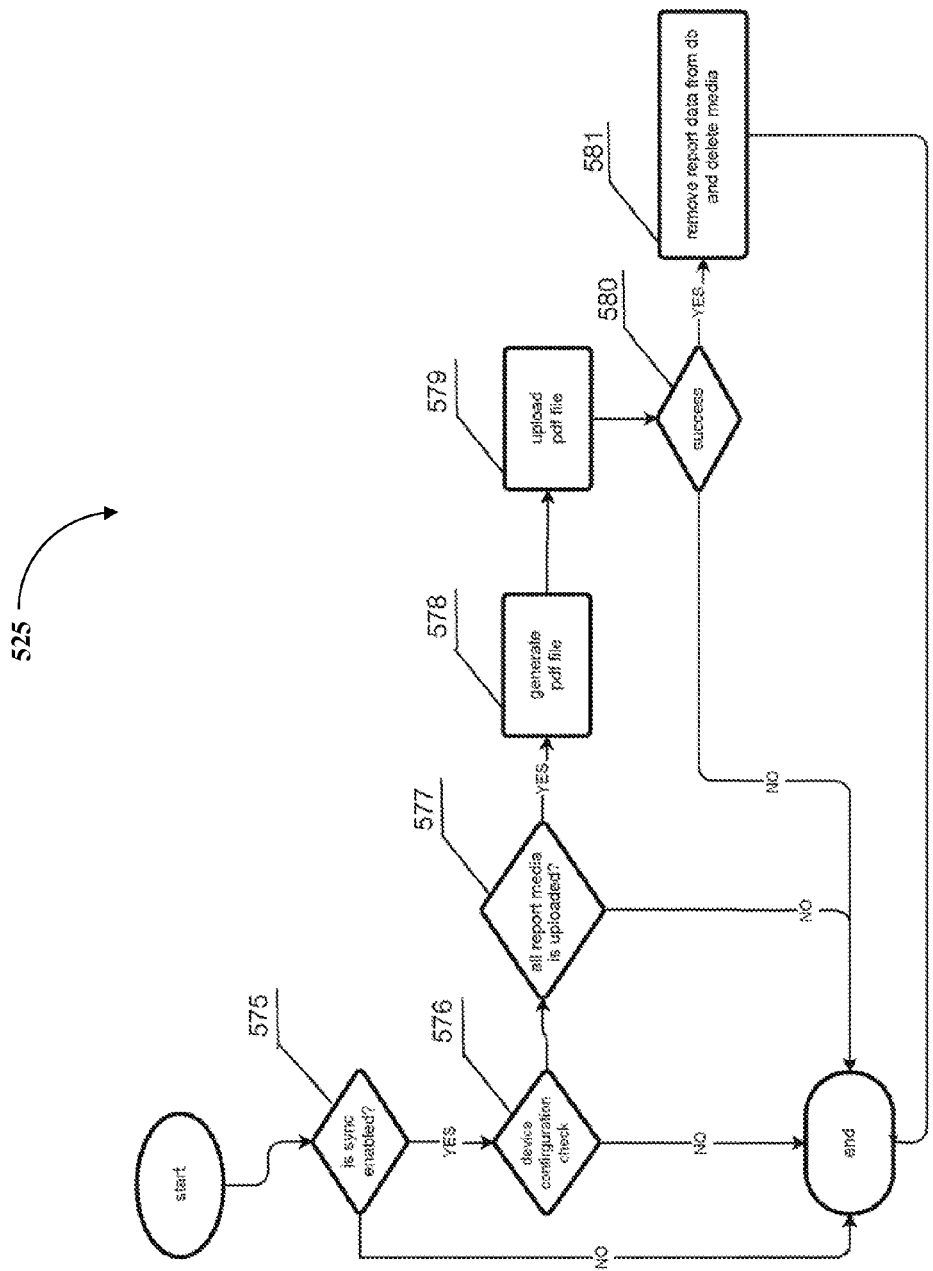
FIG. 5D – Exemplary *UploadMediaRichReport* Operation Flowchart

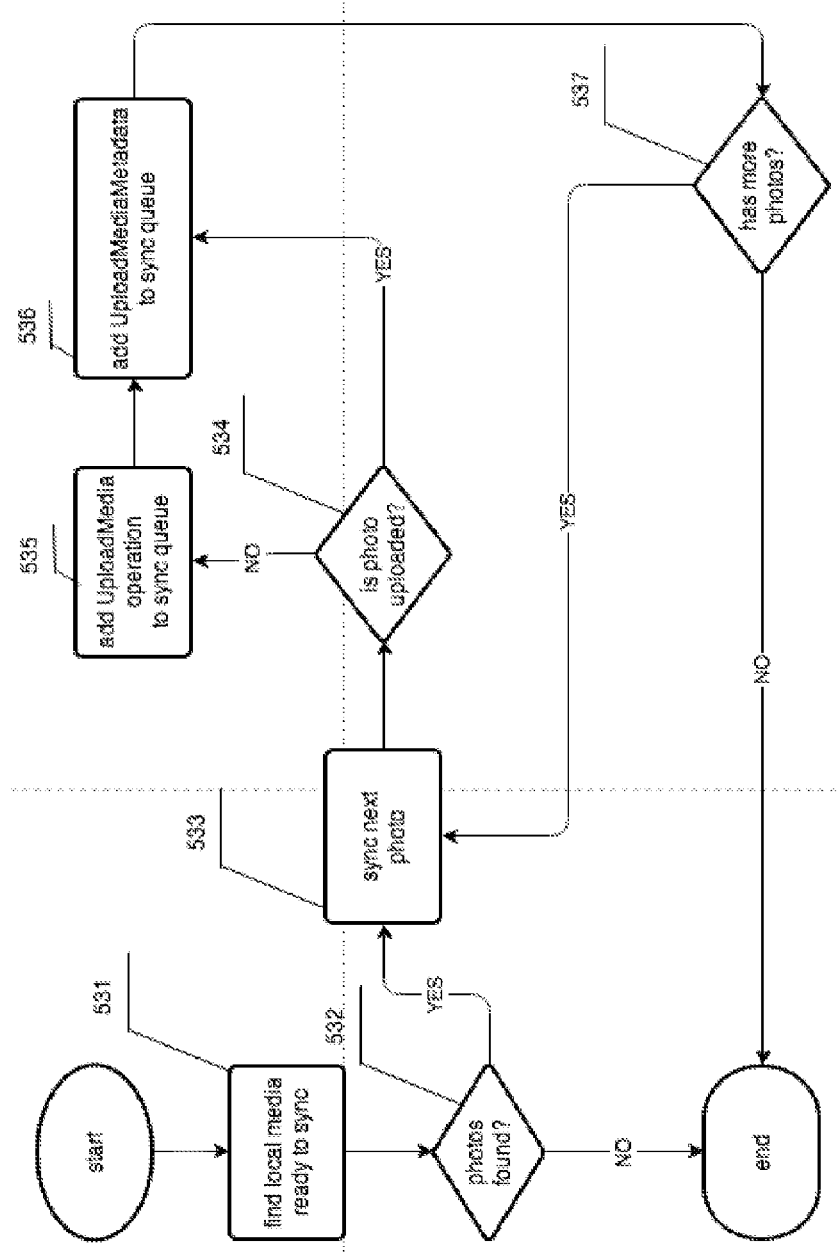
FIG. 5E – Exemplary *SyncLocalMedia* Operation Flowchart

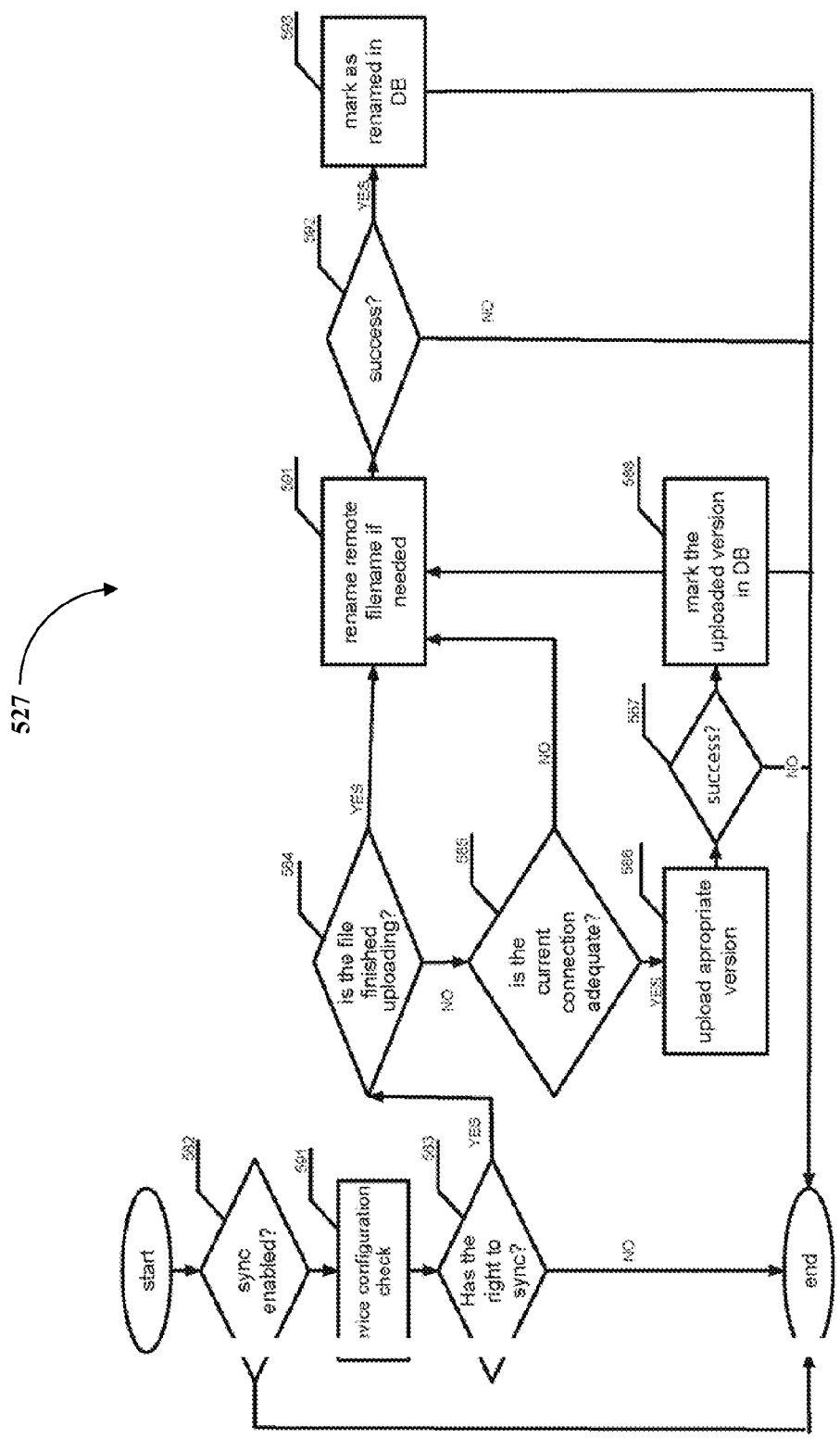
FIG. 5F – *SmartMediaUpload* Operation Flowchart

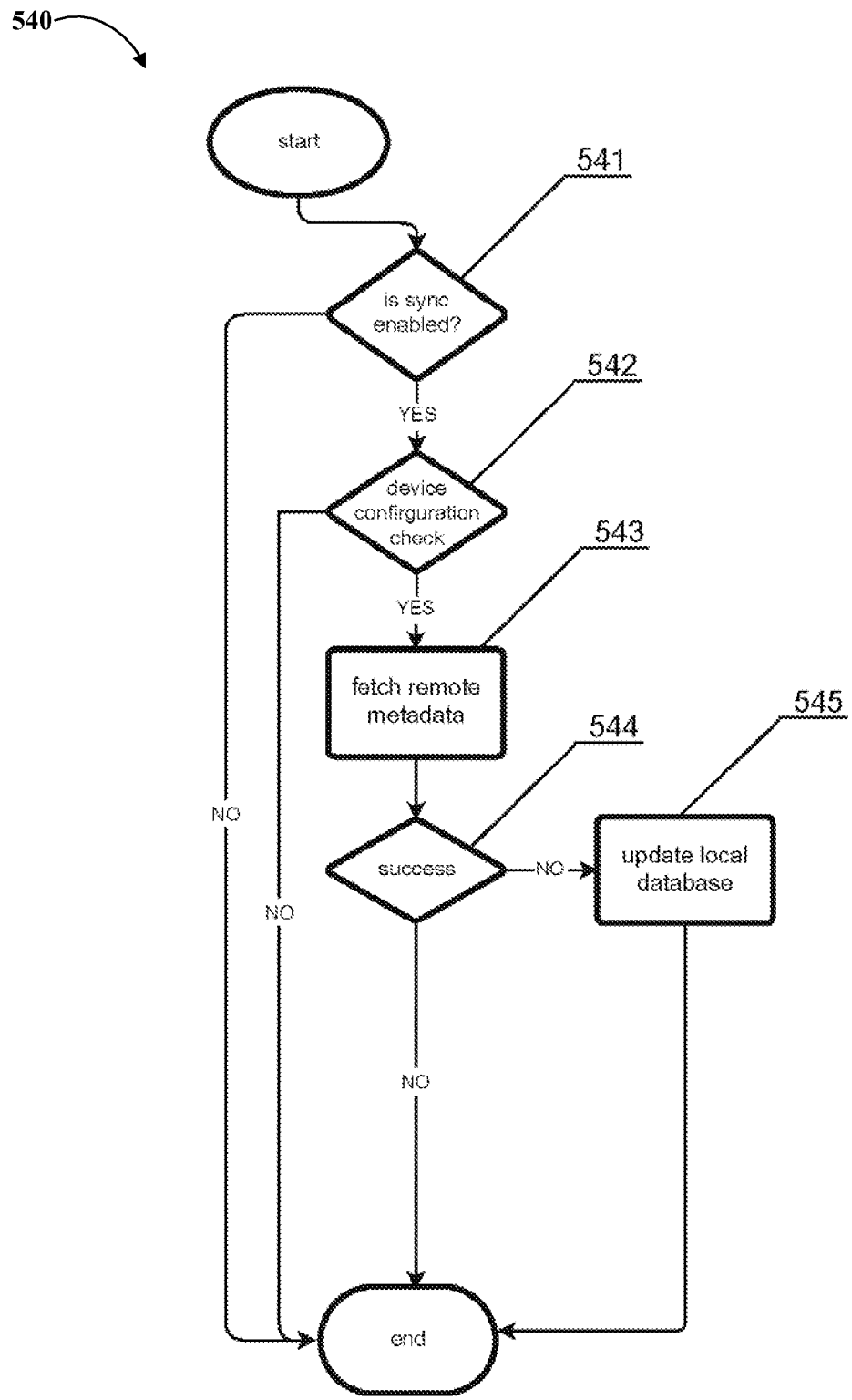
FIG. 5G – Exemplary *SyncRemoteMetadata* Operation Flowchart

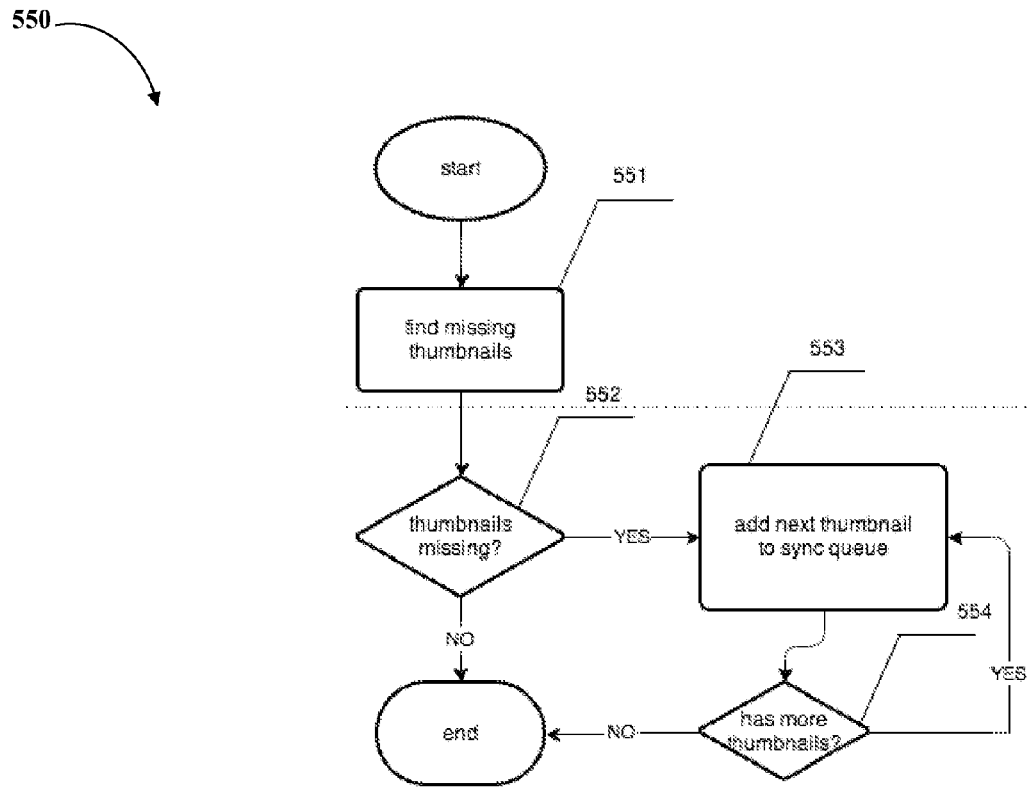
FIG. 5H – Exemplary *FetchMissingThumbnails* Operation Flowchart

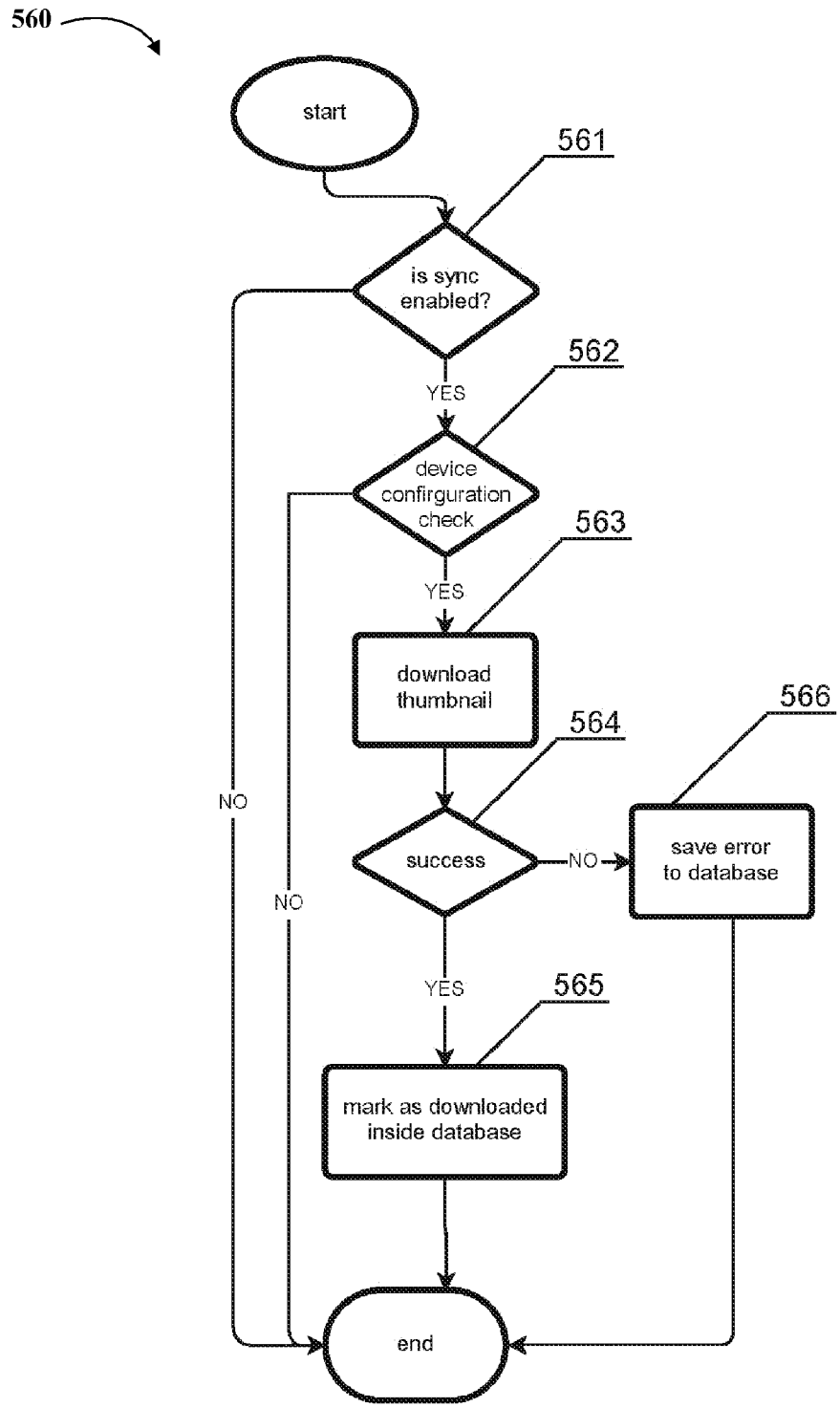
FIG. 5I – Exemplary *DownloadThumbnail* Operation Flowchart

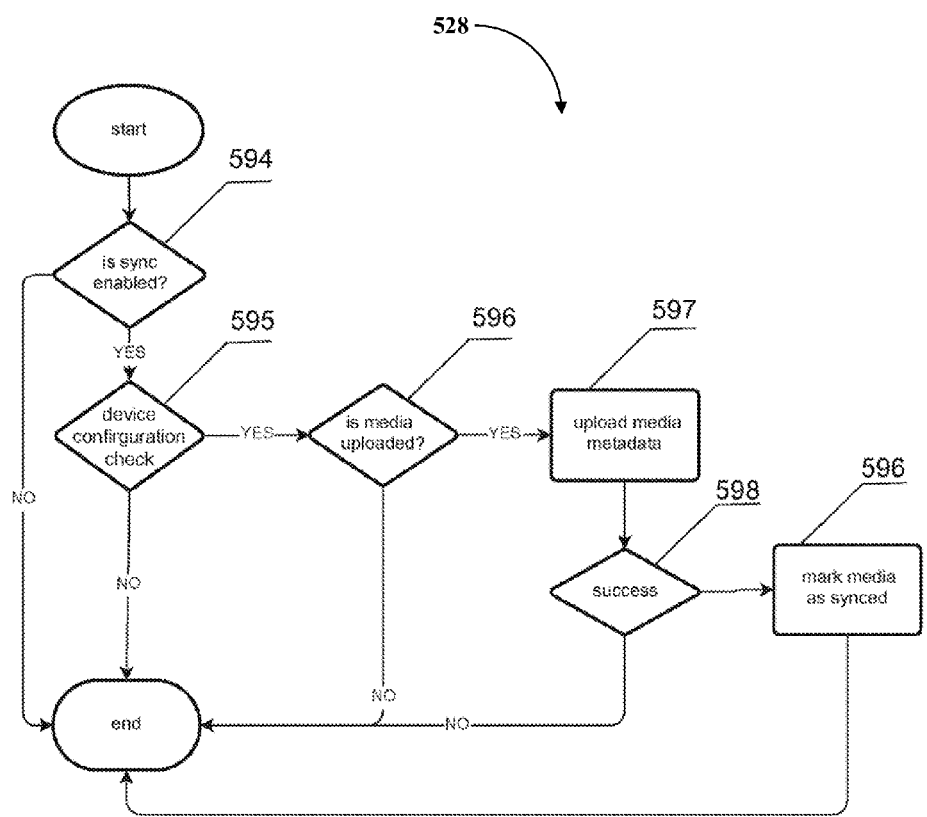
FIG. 5J – Exemplary *UploadMediaMetadata* Operation Flowchart

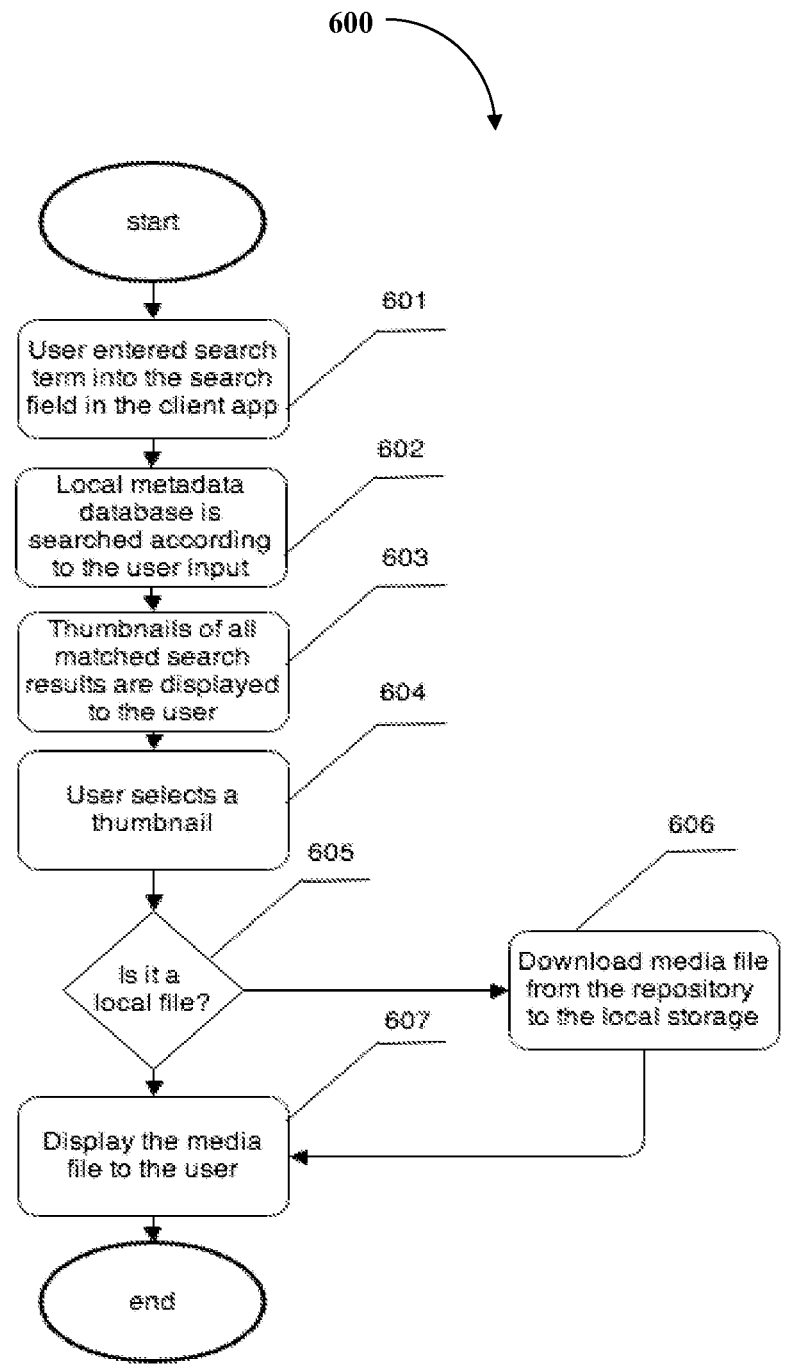
FIG.6 – Exemplary Search Operation Flowchart

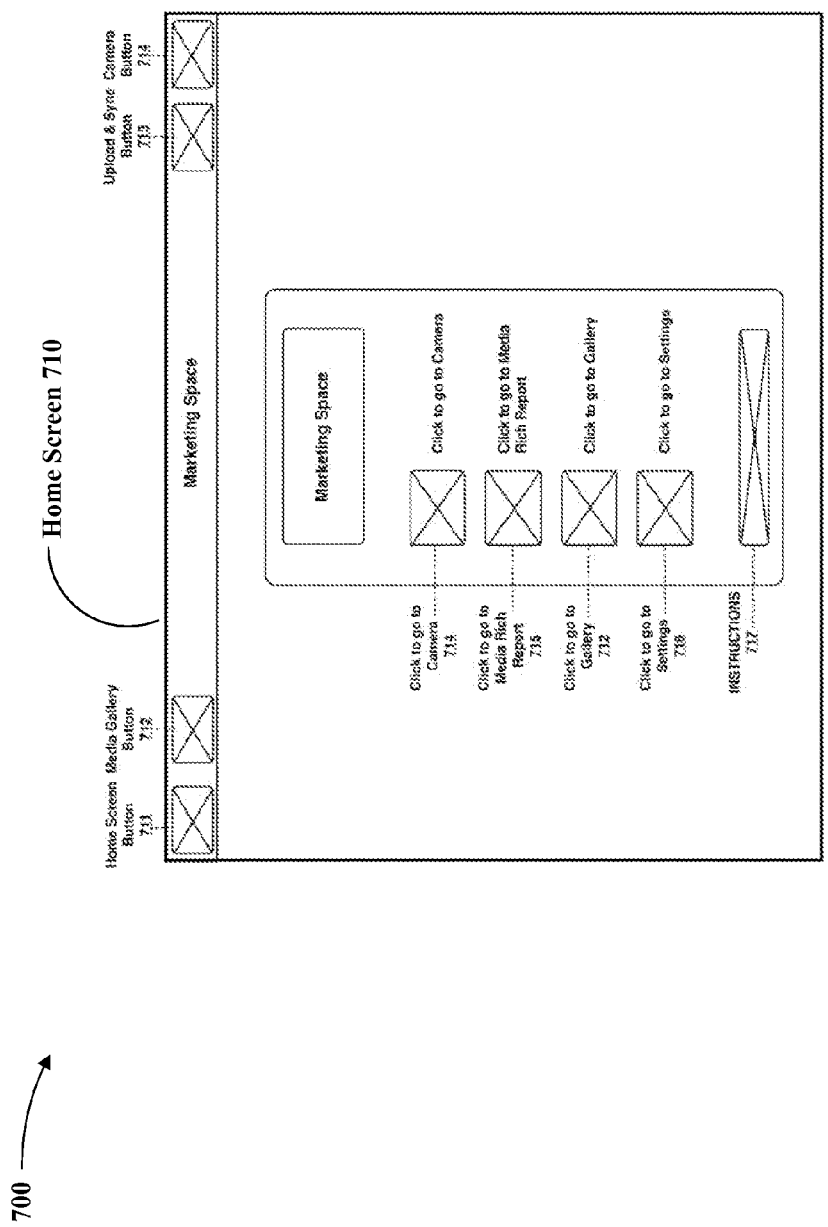
FIG.7A – Screenshot of MMICMS System Client Application Exemplary Graphic User Interface

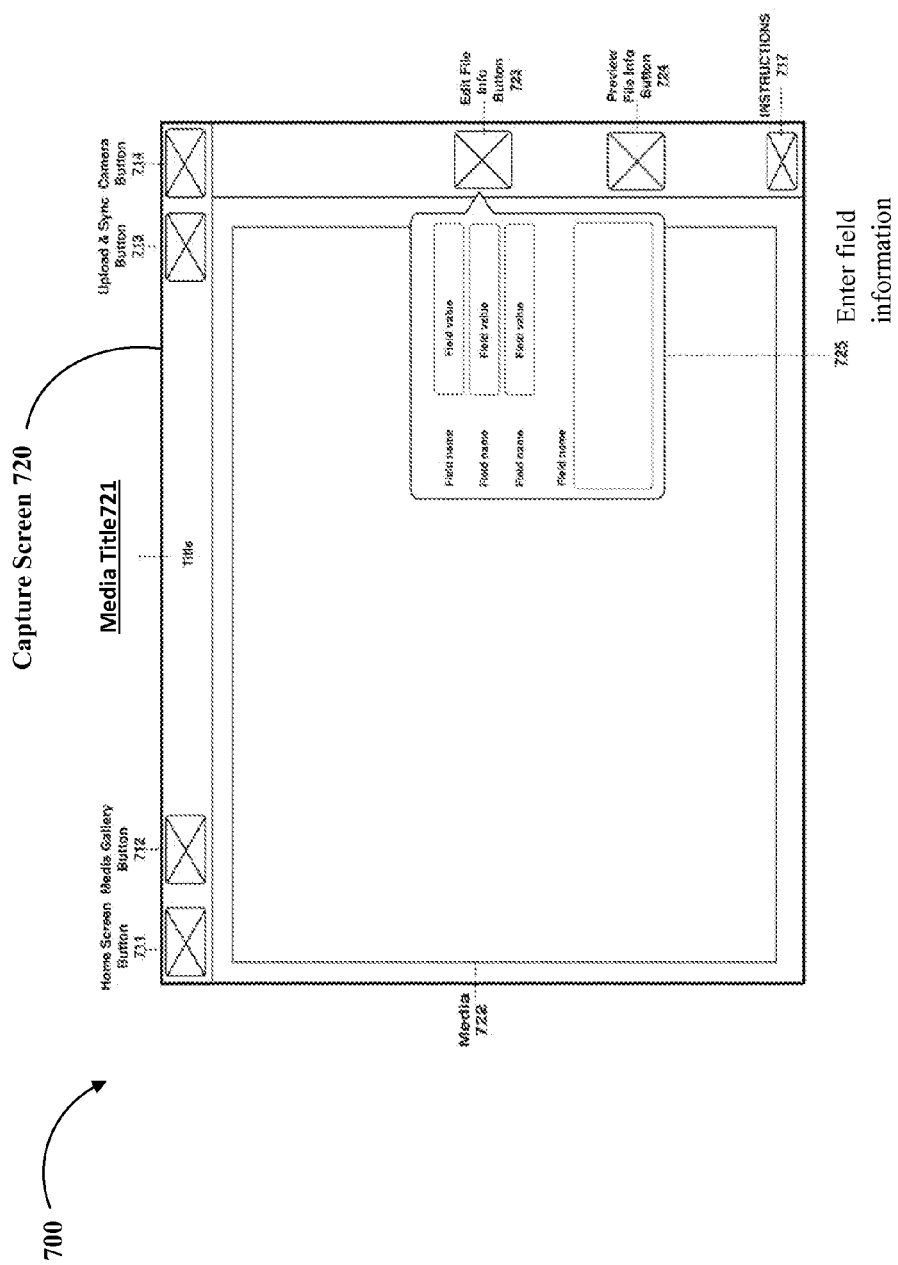
FIG. 7B – Screenshot of MMICMS System Client Application Exemplary Graphic User Interface

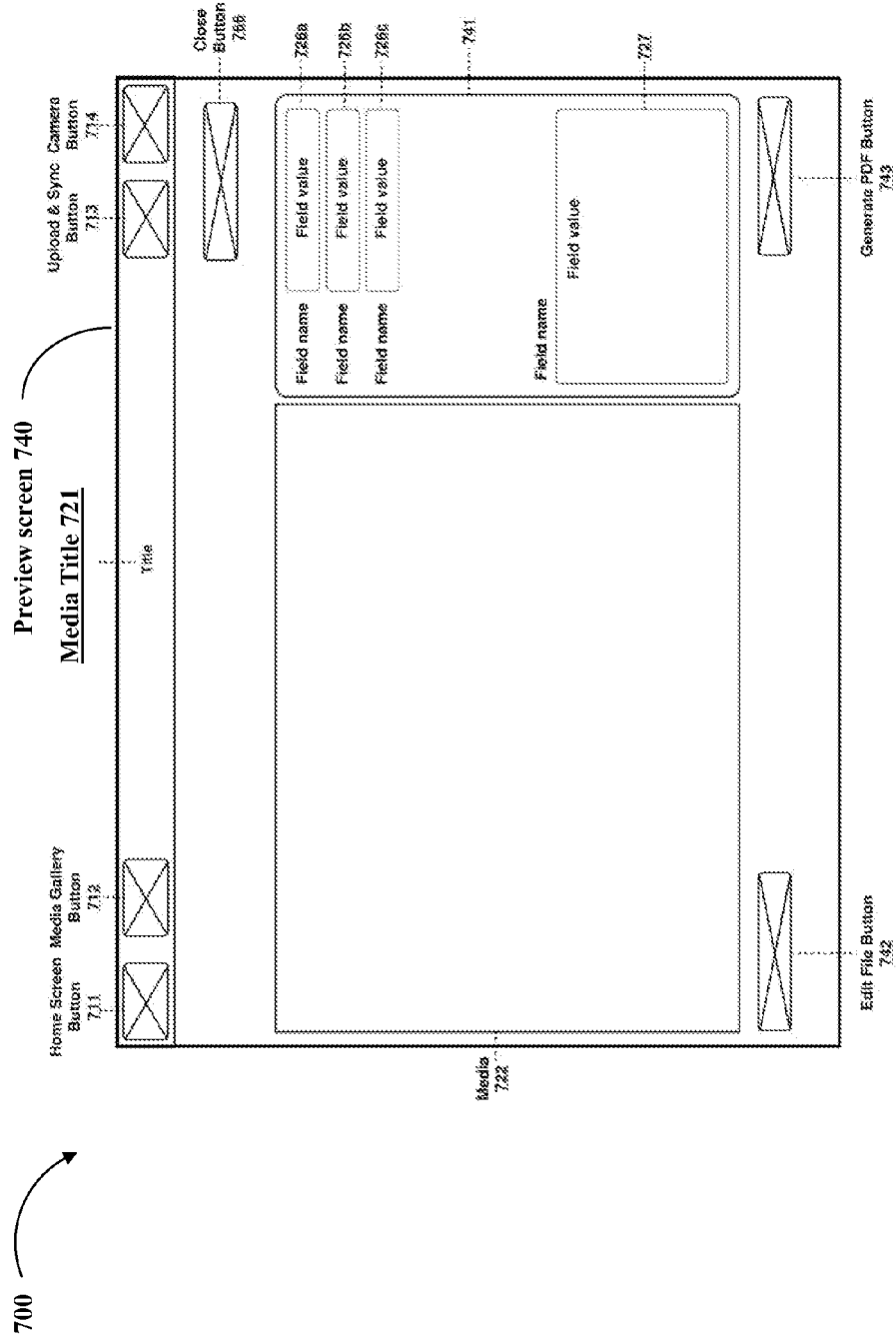
FIG. 7C – Screenshot of MMICMS System Client Application Exemplary Graphic User Interface

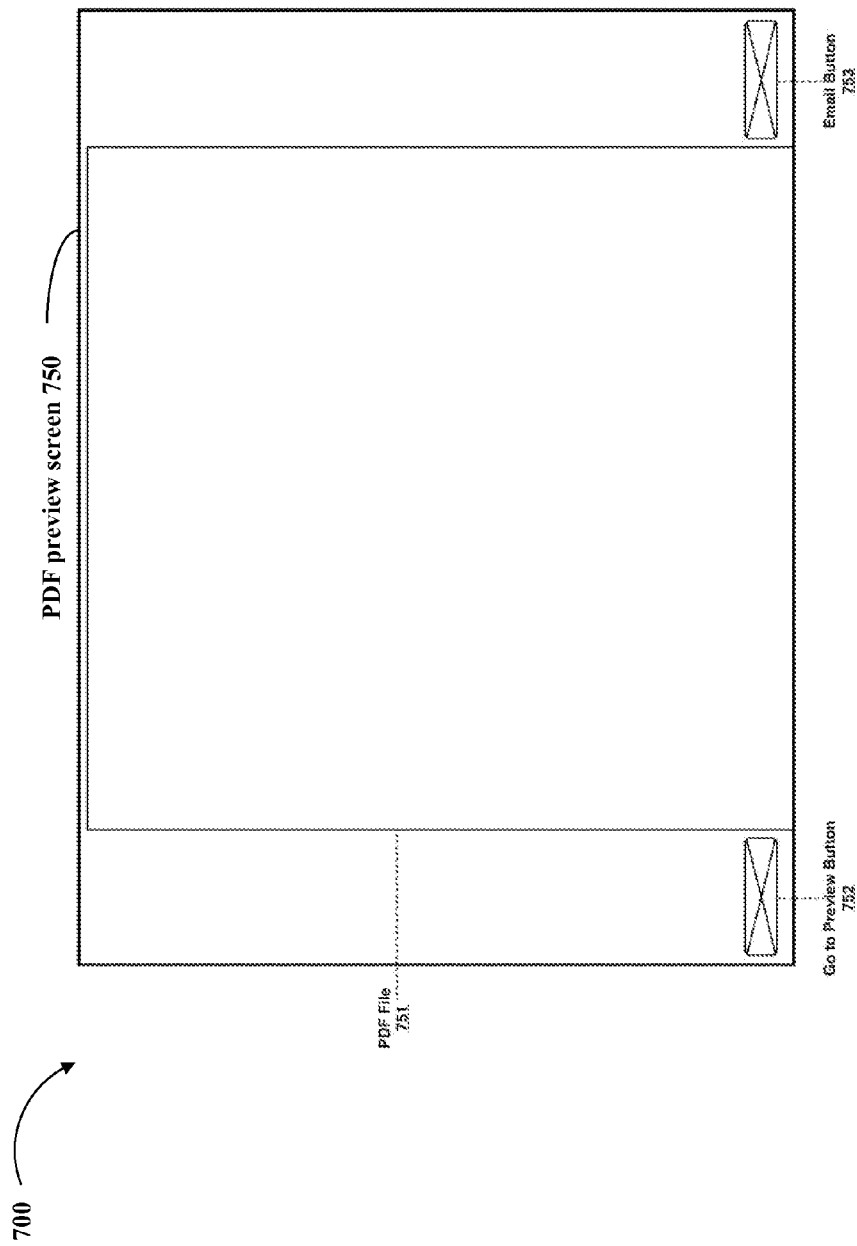
FIG.7D – Screenshot of MMICMS System Client Application Exemplary Graphic User Interface

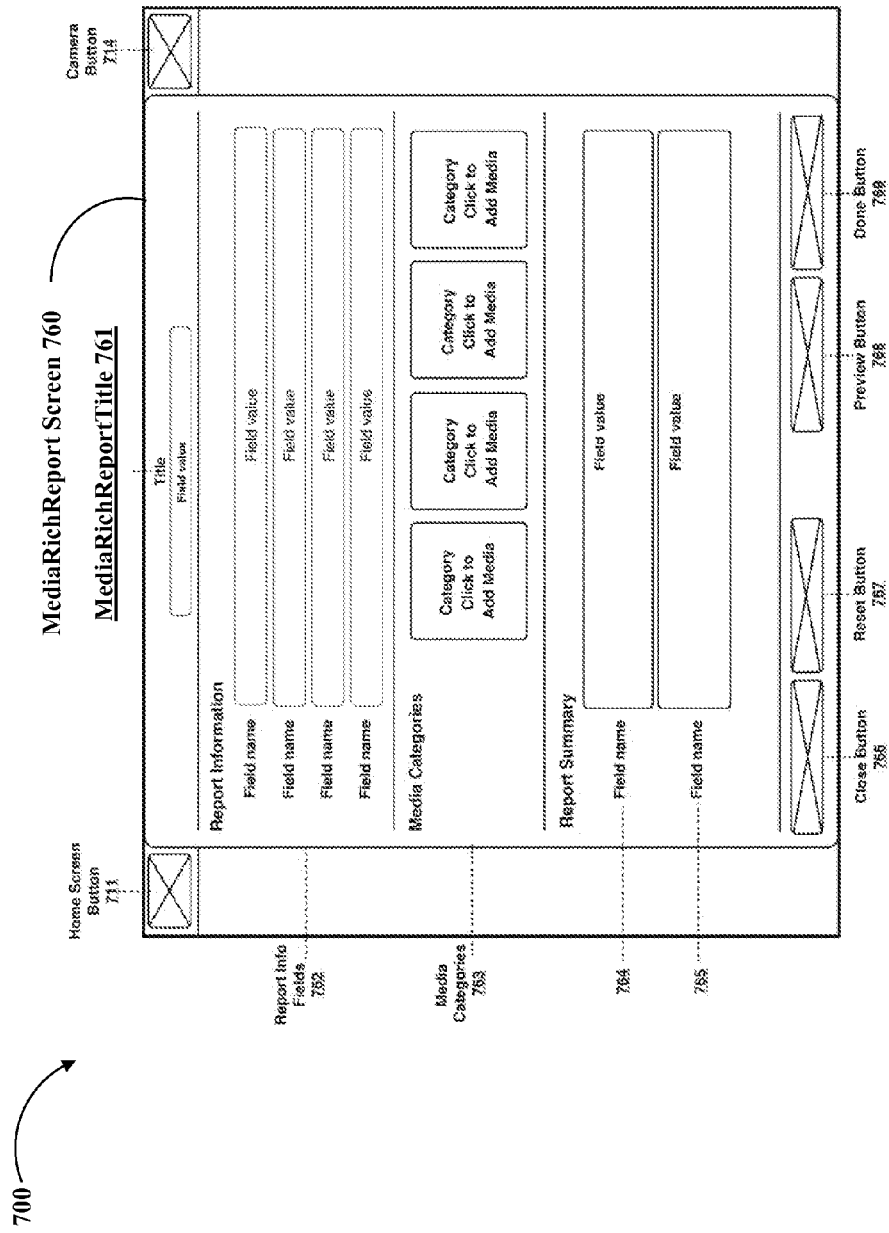
FIG. 7E – Screenshot of MMICMS System Client Application Exemplary Graphic User Interface

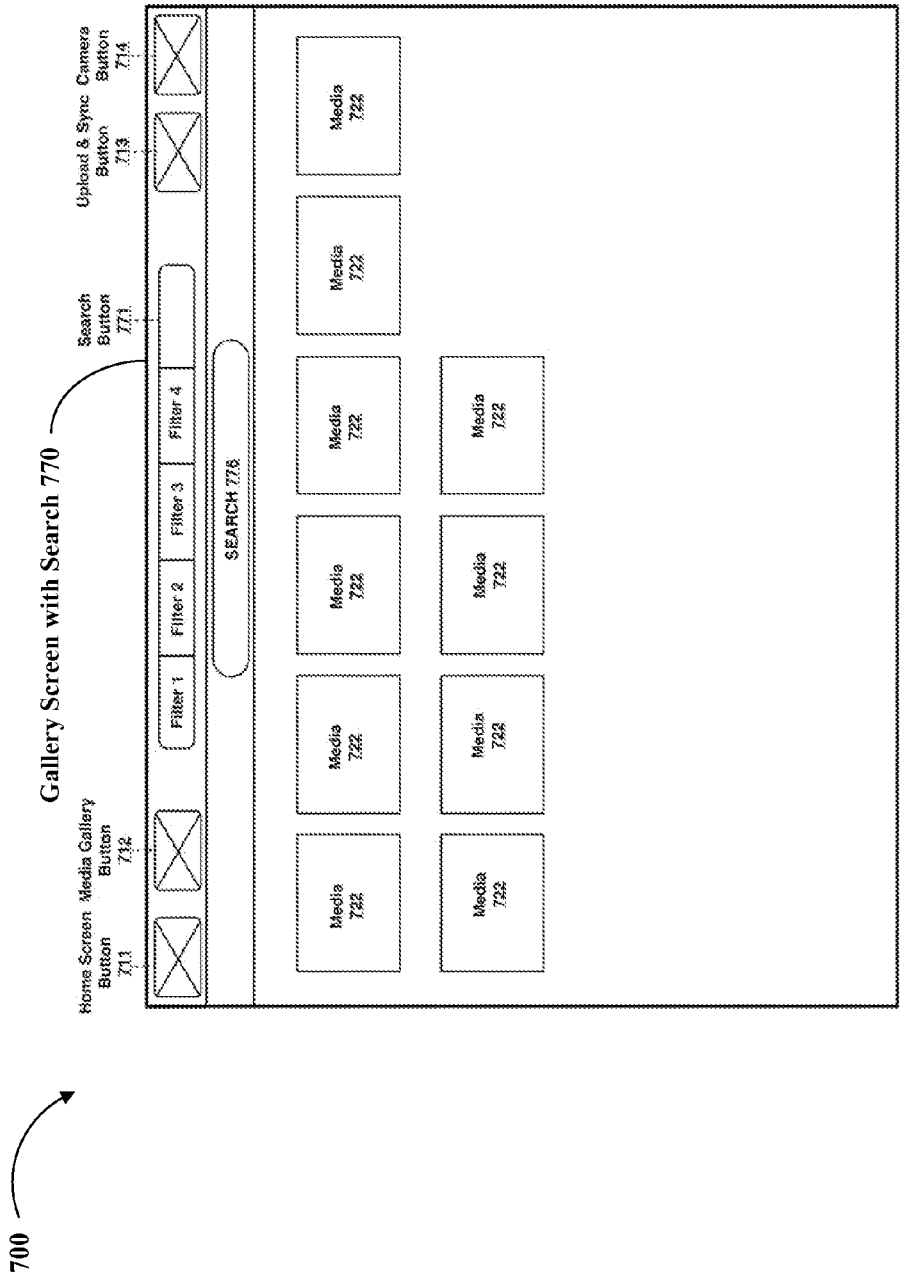
FIG.7F – Screenshot of MMICMS System Client Application Exemplary Graphic User Interface

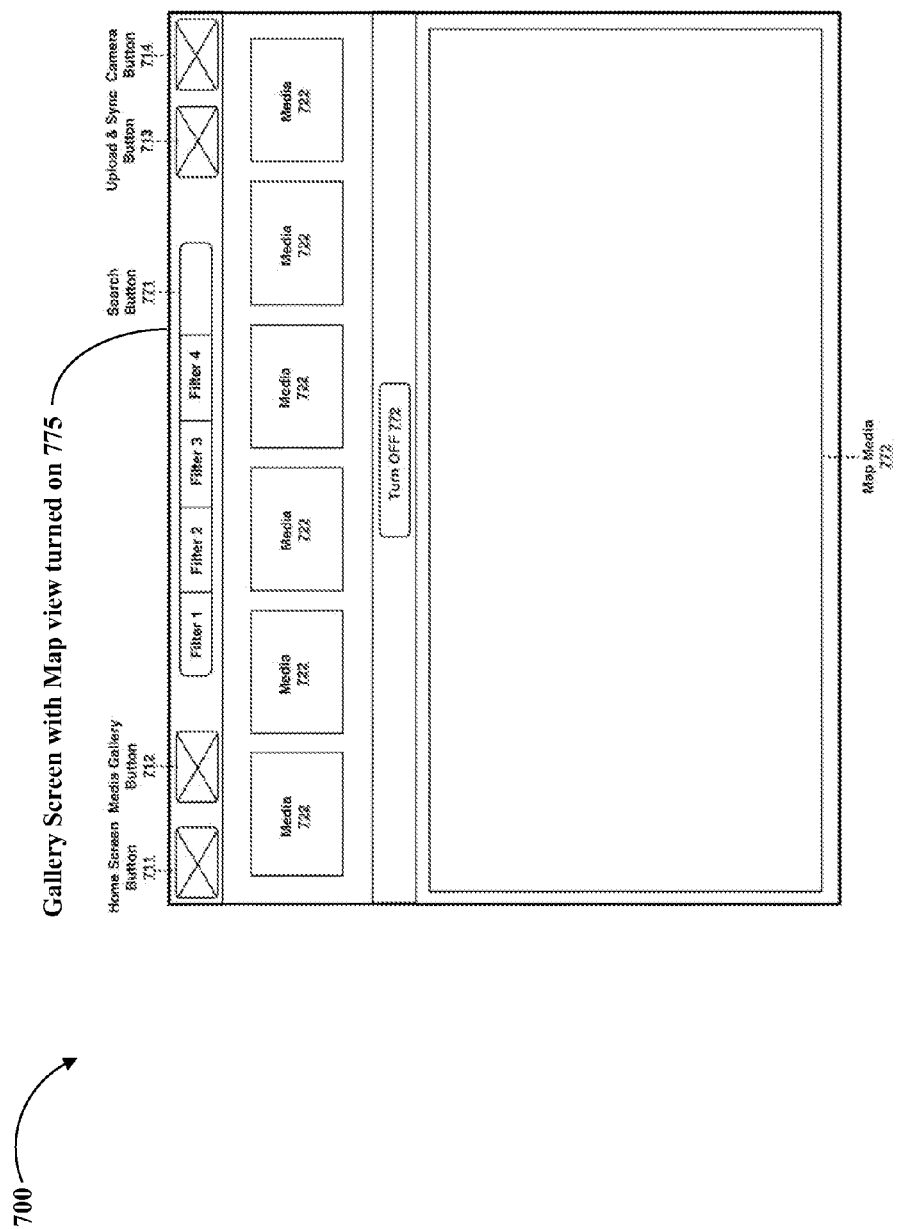
FIG.7G – Screenshot of MMICMS System Client Application Exemplary Graphic User Interface

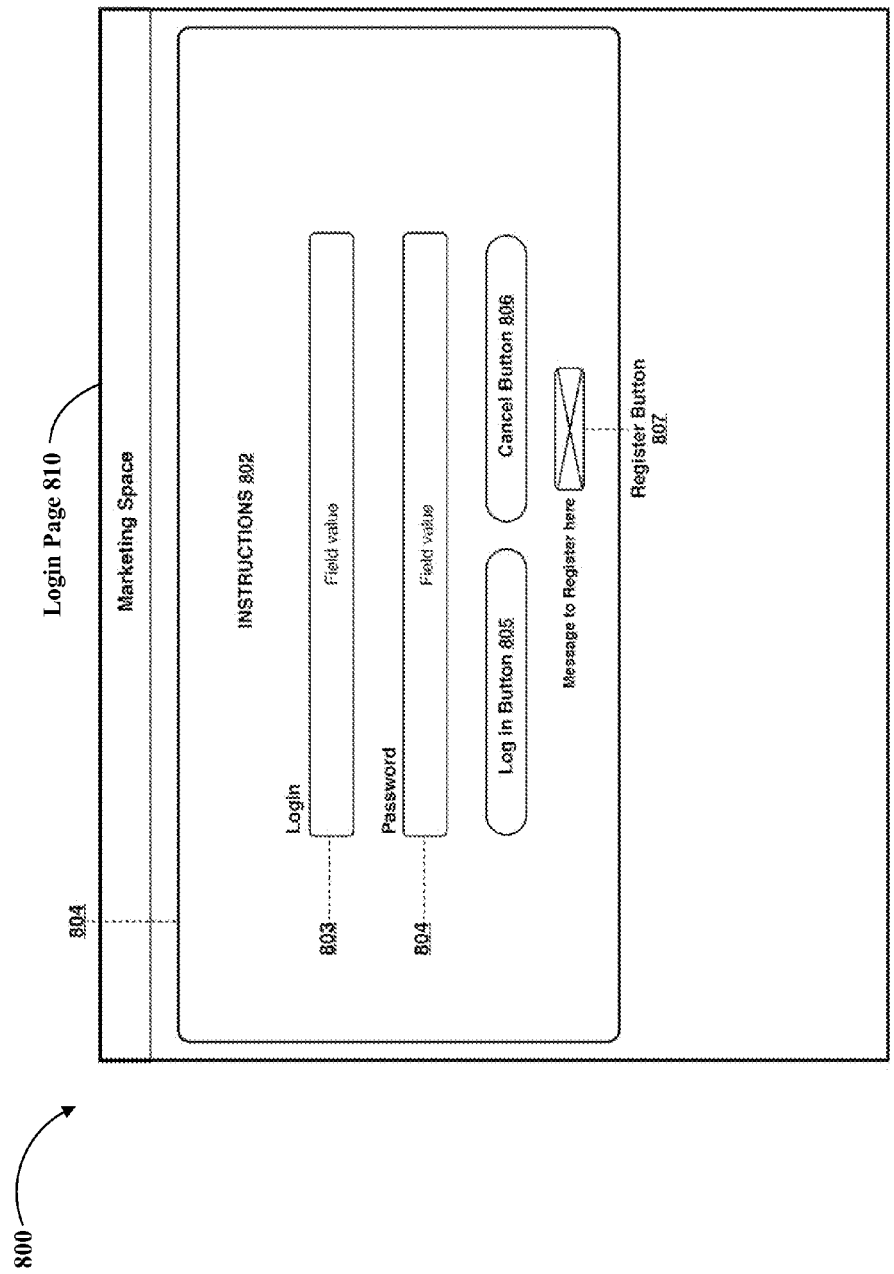
FIG. 8A – Screenshot of MMICMS System Backend Management Module Exemplary Web Portal User Interface

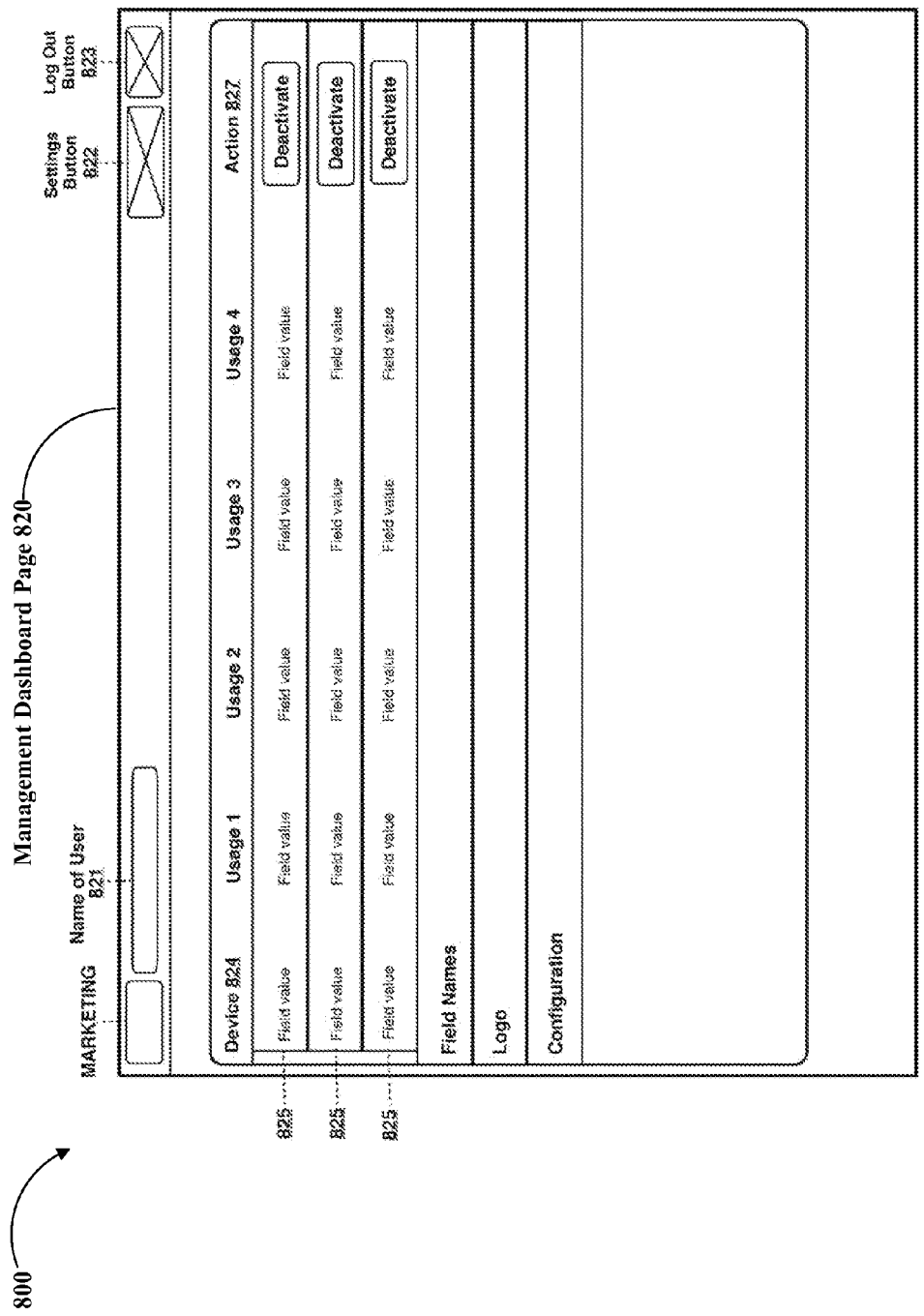
FIG. 8B – Screenshot of MMICMS System Backend Management Module Exemplary Web Portal User Interface

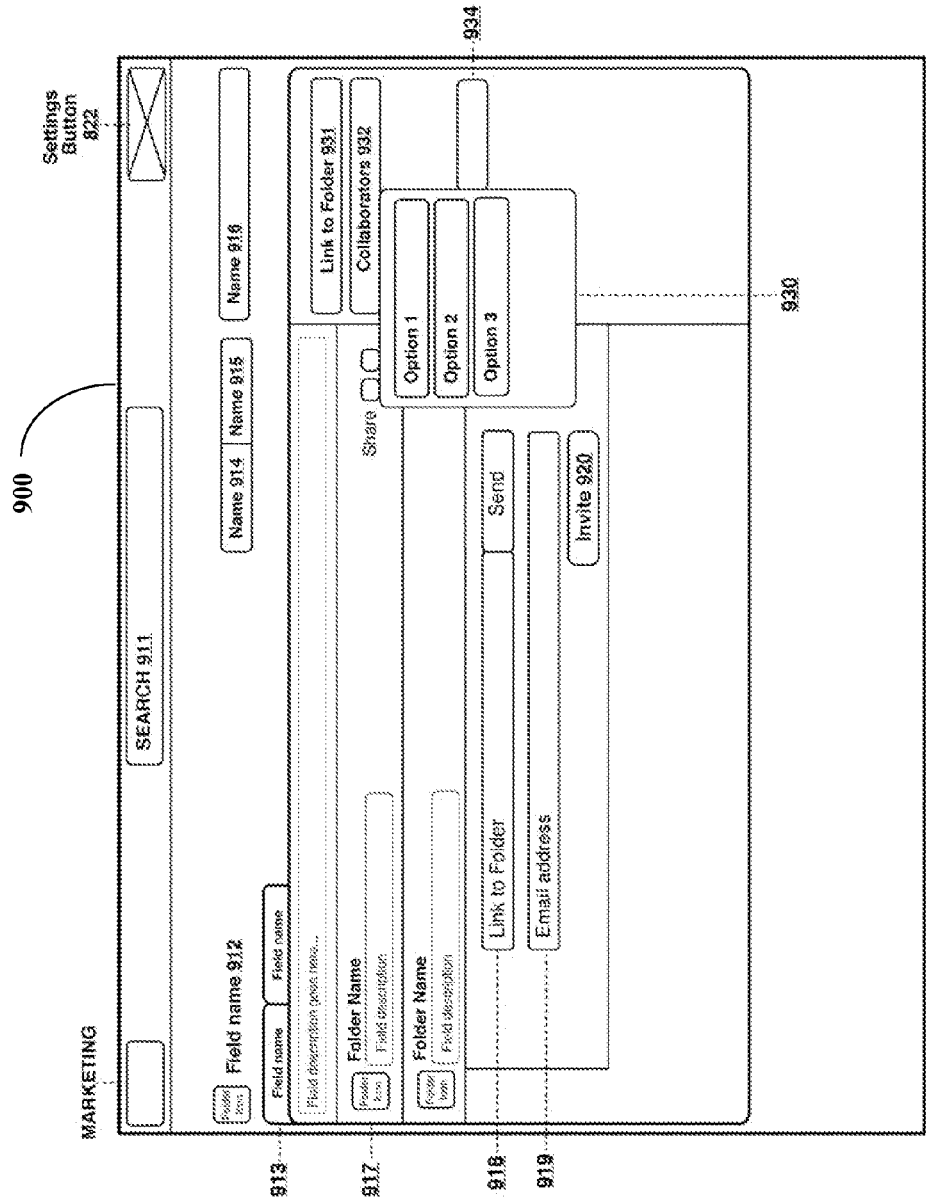
FIG. 9 – Screenshot of MMICMS System Storage Repository Exemplary Web Portal User Interface

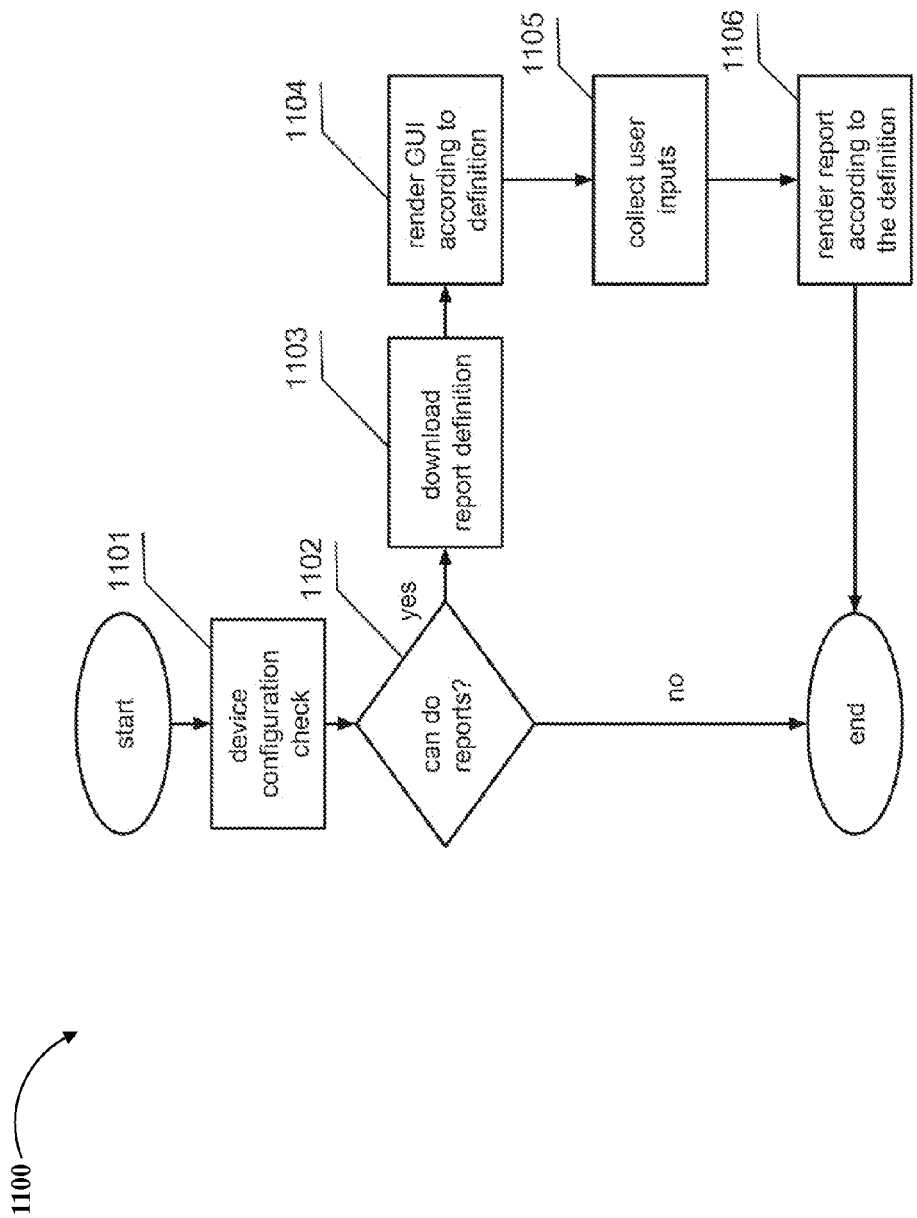
FIG.10 – Exemplary CustomReportLogic

MOBILE MEDIA INFORMATION CAPTURE AND MANAGEMENT METHODS AND SYSTEMS

CLAIM OF PRIORITY

This application claims the benefit of U.S. Provisional Patent Application No. 61/822,055, filed May 10, 2013, entitled, "Mobile Media and Information Capture and Management Systems," incorporated herein by reference in its entirety.

TECHNICAL FIELD

The present systems and methods relate generally to the use of mobile electronic devices combined with mobile software technology to capture and manage media files.

BACKGROUND

Individuals and companies often capture media files including digital images, photos, geophysical locations, dates, times, and other information about assets including, for example, land sites, residential and commercial properties, automobiles, and furniture. Particularly, professionals and companies in real estate-related industries including (but not limited to) construction, property management, insurance, residential sales, commercial property sales, leasing, and other industries and occupations with a fleet of field personnel capture media files and field information regarding assets. These individuals and companies have a need for accessing a well-organized database of captured media files and information outside the office (e.g., in the field) and/or the ability to easily search for individual media files, sets of media files, and other potentially relevant information.

Recently, there has been a rise in the use of mobile devices to capture media files and/or information in the field, but solutions appear very fragmented and focus only on certain aspects of the capture process and require additional time and resources to make the captured files and information usable. Professionals such as real estate agents, brokers, inspectors, construction superintendents, and project managers, etc. capture media files and other related information independently. In many cases, these professionals manually transfer and manually organize captured field media files and captured field information. For example, such professionals (and others) may use different solutions to capture media files, such as digital cameras. Such solutions may require manually connecting the device (e.g., the digital camera) to another computer system, manually leveraging various other solutions and/or software to store and organize the files, etc. In this example (and others), the professional's time and resources to organize the media files and make them easily accessible is multiplied by the number of solutions said professional must access and manually use.

Similarly, professionals may use multiple devices across multiple platforms to capture, store, access, and manage field data. Additionally, these professionals may use multiple web- and Internet-based solutions or their own hardware and servers, whether leased or owned. Increasingly, owners, managers, maintainers, controllers, etc. of field assets are asking for visual proof of conditions in the field along with information-rich reports, and expect to receive seamless, easy, manageable, and collaborative access to all the captured visuals and information from the field.

Therefore, there is a long-felt but unresolved need for a system and/or method that enables quick, simple, easy, and efficient capturing of media files and field information and that includes automated media file management (transfer, indexing, organization and routing/filing to repository and other management systems) based on captured field information. Moreover, there is a need for such a system to support multiple device types, brands, vendors and manufacturers, and not remain specific to certain devices, or manufacturers. At the same time, such a centralized, enterprise-wide system should be flexible to adapt to preferences of individual users and accept on-demand information, database and repository management instructions, without the need to install additional software. Further, the system should enable quick and easy setup and seamless integration with existing devices and infrastructure, and should also have the capability for automatic addition of new devices to a given group representing an individual, a team, a company, an institution, etc.

BRIEF SUMMARY

Briefly described, and according to one embodiment, aspects of the present disclosure generally relate to systems and methods of mobile media and information capture and management, and access on backend systems, including (but not limited to) storage repositories, other management systems, etc.

According to various embodiments, present systems and methods include: 1) determining whether a mobile device is connected to a wireless internet connection or is configured to receive and transmit data over a cellular network; 2) in response to determining that the mobile device is connected to the wireless internet connection or is configured to receive and transmit data over the cellular network, receiving configuration data from a backend server including one or more predetermined preferences; 3) receiving a media file and metadata from the mobile device, the metadata including information associated with creation of the media file; 4) in response to receiving the media file and metadata, generating a combined media file including embedding the metadata within the media file according to the one or more predetermined preferences; and 5) transmitting the combined media file to the backend server.

In various embodiments, present systems and methods include: 1) determining whether a mobile device is connected to a wireless internet connection or is configured to receive and transmit data over a cellular network; 2) in response to determining that the mobile device is connected to the wireless network or is configured to receive and transmit data over the cellular network, determining whether the mobile device is authorized to send data to a backend server; 3) in response to determining that the mobile device is authorized to send data to the backend server, receiving configuration data from the backend server including one or more predetermined preferences; 4) receiving a media file and metadata from the mobile device, the metadata including information associated with a location of the mobile device and a time the media file was created; 5) receiving one or more annotations from the mobile device including user-created information associated with the media file; 6) in response to receiving the media file and metadata, generating a combined media file including embedding the metadata and one or more annotations within the media file according to the one or more predetermined preferences; 7) in response to receiving a request to create a report, fetching a preconfigured report format from the backend server; 8) generating the report including the media file, the metadata, and the one or more annotations based on the preconfigured format; and 9) saving the report on the mobile device.

In further embodiments, present systems and methods include a backend server for storing and indexing metadata including at least one processor, wherein the at least one processor is configured to: 1) receive a first media file and first metadata from a first mobile device, the first metadata including location information associated with a location where the first media file was created, a project associated with the first media file, a date associated with the first media file, and device identification information associated with the first mobile device; 2) in response to receiving the first media file and first metadata from the first mobile device, indexing the first media file and the first metadata in one or more predefined index locations by the first metadata; 3) receive a second media file and second metadata from a second mobile device, the second metadata including location information associated with a location where the second media file was created, a project associated with the second media file, a date associated with the second media file, and device identification information associated with the second mobile device; 4) in response to receiving the second media file and second metadata from the second mobile device, indexing the second media file and the second metadata in additional one or more predetermined index locations by the second metadata; 5) receiving a search request from a particular mobile device, the search request including a project search term and a date search term; 6) in response to receiving the search request from the particular mobile device, determining whether the indexed first or second metadata include the project search term and the date search term; and 7) in response to determining that the indexed first metadata includes the project search term and the date search term, transmit the first media file to the particular mobile device.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein:

FIG. 1 illustrates an exemplary environment of an embodiment of a mobile media and information capturing and management system (MMICMS).

FIGS. 2A and 2B show exemplary MMICMS architectures including various software modules, engines, and other similar elements, according to embodiments of the present system.

FIG. 3 shows an exemplary client architecture including various exemplary software modules, engines, and other elements, including a metadata embedding engine for embedding and extracting metadata from a media file, according to one embodiment of the present system.

FIG. 4 shows an exemplary backend management service architecture including various exemplary software modules, engines, and other similar elements, according to one embodiment of the present system.

FIGS. 5A-5J are flowcharts illustrating an exemplary overall synchronization process including exemplary steps for mitigating media upload performance problems of slow network connections, according to one embodiment of the present system.

FIG. 6 is a flowchart showing steps of an overall search process, performed by various exemplary software modules and engines of the MMICMS, according to one embodiment of the present system.

FIGS. 7A-7G show screenshots of exemplary MMICMS interfaces showing an overview of an exemplary capture module user interface for device clients, according to one embodiment of the present system.

FIGS. 8A and 8B are screenshots of an exemplary MMICMS web portal management interface for managing device access to central database and managing sorting and organization rules and policies for media files being transferred to a repository, according to one embodiment of the present system.

FIG. 9 is a screenshot of an exemplary MMICMS third party repository service provider's web interface for accessing and managing media files, according to one embodiment of the present system.

FIG. 10 is a flowchart showing exemplary steps of creating a custom report, performed by various exemplary software modules and engines of the MMICMS, according to one embodiment of the present system.

DETAILED DESCRIPTION

Prior to a detailed description of the disclosure, the following definitions are provided as an aid to understanding the subject matter and terminology of aspects of the present systems and methods, are exemplary, and not necessarily limiting of the aspects of the systems and methods, which are expressed in the claims.

DEFINITIONS/GLOSSARY

Authentication Information: Data or attributes used to create an operative link between a user's mobile device and the user's repository. Examples of authentication information include, but are not limited to: information identifying a user's mobile device, a network address of the user's device, a network address (e.g., URL, IP address, MAC address, I2C bus address), user credentials or any similar identifier which can be used to identify and access devices via a network, etc. In some embodiments, authentication information may include predefined GPS locations.

Backend Management Service: A server based service that enables proper authentication and authorization checks for individual devices as well as administering, synchronization, and/or propagating configuration settings of any given account to each device associated with that account. In various embodiments, a backend management service includes a web-based user interface for providing access to configuration settings of a service as well as access to media uploaded by any/all devices associated with any given account, group, or portion of a group.

Device Information: Data or attributes pertaining to a specific device. Examples of device information may include, but are not limited to, device type, device model number, manufacturer, network name/address associated with device, location of device, business unit associated with the device, operating system running (if any) on the device, etc.

Field Information: Any information gathered in the "field" (e.g., outside the office or typical work setting). May be associated with a media file (e.g., latitude and longitude coordinates, date stamp, time stamp, etc.) and may include other free flow information including (but not limited to)

filled form fields, drop down boxes, radio buttons, general comments, drawings, sounds recordings, etc.

Location Information: Data or information relating to the physical location of something. Examples of location information include, but are not limited to, latitude and longitude coordinates, coordinates on a grid or map, certain rooms or areas within a building, cities, counties, states, countries, and the like.

Media file: Any electronic or digital file, of any file type, including, but not limited to, image, photo, video, and sound recording digital files.

Metadata: Any data describing the content of data files, such as, media files. Examples of metadata include, but are not limited to, time stamp information, geographical information (e.g., coordinates), location name, address, user comments, annotations, etc. In various embodiments, metadata may be embedded into media files (along with any field information). In at least one embodiment, metadata is used as a search parameter for finding a media file or a set of media files.

Mobile Device: Any device that can capture media and provides information about a user and/or device such as location, date, time, etc. Examples of mobile devices include (but are not limited to) mobile, cellular phones, "smart" phones, personal digital assistants (PDAs), tablet computing devices, "mobile" cameras and other devices that run on operating systems and have network connectivity.

Mobile Media Information Capturing and Management System (MMICMS): A system constructed as described in this document that, according to various embodiments, enables capturing, tagging, annotating electronic media files, capturing information associated with said electronic media files, embedding the said captured information, tags, and annotations as metadata into the media file, transferring, organizing, and routing media files to one or more specific electronic destinations like electronic folders or databases based on the captured field information and metadata, and managing the captured files on backend systems, storage repositories or other management systems, comparing captured and associated metadata with other data maintained on the backend servers, regardless who manages, owns, or maintains the servers.

Repository Connector: A standard software interface that allows an application to access available online service data, a database management system (MS SQL, ORACLE™ FIREBIRD™, MYSQL™, etc.), or a standard Internet service such as email. Repository connectors allow programmers to treat disparate data sources as if they were sets of database tables. Typically, they are made to be independent of programming languages, database systems, and operating systems.

Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments and any further applications of the principles of the disclosure as illustrated therein are contemplated as would normally occur to one skilled in the art.

Aspects of the present disclosure generally relate to systems and methods of capturing electronic media files, tagging and annotating said electronic media files, capturing associated information (e.g., time and place information), embedding the captured information, tags, and annotations as metadata into the media file, automatically transferring and routing media files with embedded metadata into specific electronic destination(s) like electronic folders or databases, and managing the transfer and organization of the captured files with embedded metadata on backend systems, storage repositories, or other management systems. Additional aspects of the present systems and methods relate to completion of a server-based confirmation process involving authentication of a user's mobile device, comparison of the captured metadata and associated electronic media file against other data maintained on the backend servers (e.g., other metadata), regardless who may be managing, owning, or maintaining the servers. In various embodiments, the system embeds metadata with a media file using standard XMP (eXtensible Metadata Platform) format, while the metadata itself is saved in an XML format within the XMP envelope.

Further aspects of the present disclosure relate to using a mobile device and a client application. According to particular embodiments, the client application includes a simple and efficient user interface organized with a top line navigational bar with a few main navigational buttons (e.g., four navigational buttons) and a side bar with main action buttons (e.g., four action buttons). In various embodiments, a user may achieve a desired action or result in a predetermined number of clicks (e.g., three clicks).

Still further aspects of the present disclosure relate to using an automated embedding engine that automatically embeds captured field information, tags, annotations, and electronic media files together with a crypto hash technology, which may provide additional control and validation of the origin of the media file and embedded metadata. In some embodiments, the crypto hash technology is SHA-1, an industry standard used to verify data integrity, as will be recognized by one of ordinary skill in the art. According to at least one embodiment, the entire metadata XML file is sent as an input to the SHA-1 algorithm, and the resulting hash is saved to the metadata itself. In this way, in these embodiments, to confirm data integrity, the process can be repeated and the resulting hash can be checked against the saved hash with the metadata.

In various embodiments, aspects of the present disclosure include automated synchronization processes and methods for synchronizing media and information between at least two mobile devices and one or more client applications based on tables, databases, manually entered information, captured data, etc. through a backend management service that matches the metadata across devices. According to particular embodiments, aspects of the present disclosure include sophisticated methods of using captured metadata to facilitate faster searching and identification of one or more appropriate electronic media files with the matching metadata embedded within the file.

Additionally, aspects of the present disclosure relate to sophisticated methods of processing, transferring, and uploading files (e.g., media files) to optimize for the quality of network connection (e.g., by choosing a quality/size of upload based on network speed and/or bandwidth). Moreover, aspects of the present disclosure generally relate to enabling automatic notifications to be sent to one or more designated third parties upon the modification of an existing media file and easy and efficient access to a management module on any internet connected device through web portals and/or client applications on mobile devices.

Further aspects of the present disclosure relate to the creation of one or more reports that may include the previously mentioned media files. According to various embodiments, aspects of the present disclosure relate to MediaRichReports, which may include any suitable data, information, and files, to be further discussed herein. It should be understood from discussions herein that a MediaRichReport may be in any suitable format and may have a pre-defined or customizable structure.

According to a particular aspects of the present disclosure, once a user creates a MediaRichReport (or any other suitable report), the user may convert the MediaRichReport to a PDF file. In various embodiments, the user may then preview, save, and/or transmit (including email to others) the PDF file version of the MediaRichReport.

EXAMPLES/USE CASES

Particular examples may help promote an understanding of the principles of the present disclosure. It should be understood that these particular examples are merely to promote the understanding of the present systems and methods and should not be taken as limiting.

First Example/Use Case

In a first particular example, relating to the construction industry, a construction superintendent takes photos and videos of site conditions on a daily bases for documenting "as-built" conditions and providing information for quality control, tracking of issues, and reporting. The superintendent, continuing with this first particular example, generally captures photos (media) and site information on a mobile device (e.g., a digital camera, a mobile phone with a camera, etc.) and manually triggers (e.g., activates) transfer (e.g., upload) of the captured photos. In this first particular example (and according to conventional technologies and systems), the superintendent may have to manually facilitate upload of the captured photos and other site information by connecting the mobile device to another computing device such as a laptop computer, desktop computer, etc. Continuing with this first particular example (and still according to conventional technologies and systems, once the captured photos are uploaded, the superintendent may have to organize the captured photos and site information to create periodic reports including the captured photos and site information, potentially spending a large portion of time creating such reports.

As a second particular example, the superintendent (e.g., the superintendent of the first particular example) creates similar reports to those discussed above, but uses at least some functions of the systems and methods disclosed herein (e.g., the MMICMS system) in conjunction with a cloud storage solution offered by a third party service provider which includes web access and collaboration on stored content (to manually name and organize files, share links to files or folders, etc.). Continuing with this second particular example, the superintendent uses the MMICMS to capture photos of the construction site, tag and annotate the photos (e.g., notes, comments, potential issues, potential solutions, etc.), and capture associated information, such as a date, time, conditions on site, etc. The MMICMS, in this second particular example, embeds the captured information, tags, and annotations as metadata into the captured photo files, and automatically transfers and routes the captured photo files (with embedded metadata) to specific electronic project folders and subfolders (e.g., organized in any suitable way, such as by type of work, client, etc.) on a third party cloud storage provider (e.g., Box.com, Dropbox, etc.). The MMICMS, continuing with this second particular example, uses data about the superintendent's network connection to optimize the upload of the captured photo files to the project folders and subfolders. In this way, in this second particular example, the superintendent does not have to manually upload and organize the captured photo files and associated information.

Continuing with this second particular example, the superintendent and others working on the same project (e.g., other superintendents or managers on the same work site, for example) may automatically synchronization information on mobile devices (e.g., mobile devices that are capturing photos, etc.) using the MMICMS client applications based on metadata tables and fields, such as GPS location. In this second particular example, the superintendent searches for plumbing-related photos captured on the work site by searching for captured photos tagged with a "plumbing tag." In response to receiving a plumbing tag search request, in this second particular example, the MMICMS searches the metadata of captured photos for photos with the plumbing tag and returns said plumbing-tagged photos to the superintendent.

In this second particular example, the superintendent then creates a report using any of the synchronized information discussed above (e.g., the superintendent creates a MediaRichReport, as further discussed below). The superintendent may include user entered data in response to particular pre-set questions of the report (e.g., "describe the project" and/or "what is today's date"), device recorded data, such as location, time, and address as available, device calculated data (e.g., project name based on metadata), media files with metadata, such as annotations, comments (e.g., photos taken of the work site with the superintendent's comments), etc.

Alternate Example/Use Case

Additionally, an alternative exemplary use case may be beneficial. In this alternate example, assume home inspectors are inspecting a home and taking photos and capturing information about the home. Continuing with this alternate example (and under a conventional system), the home inspectors then spend additional time to transfer the captured media files and captured information files to a company central system. For this alternate example, the home inspectors use their own proprietary backend system that may drive further actions, such as, for example generating additional reports or marketing brochures.

Continuing with this alternate example, the home inspectors instead utilize aspects of the presently described MMICMS system and inspect a second home. While inspecting this second home, the home inspectors use a device with a digital camera and the MMICMS system running in the background (e.g., the home inspectors are each using a mobile device with a digital camera running the MMICMS application). While inspecting this second home, in this alternate example, the home inspectors capture various photos of the second home and information, such as the date, time, location, etc. The MMICMS also enables the home inspectors, in this alternate example, to tag the captured photos with rent or sale tags to facilitate easy searching later. In this alternate example, the MMICMS system embeds the captured information as metadata into the photo files, automatically transfers and routes the photo files with embedded metadata, using an optimized upload based in part on network speed (as discussed herein), into specific electronic folders (e.g., rent and sale main folders with property subfolders and additional media category subfolders) on the home inspectors' proprietary systems that house the backend management service (installed on the home inspectors' company servers). The MMICMS, in this alternate example, further enables the home inspectors to then search for the captured and uploaded photos using the metadata and/or rent or sale tags.

Exemplary System Environment

Referring now to the figures, FIG. 1 illustrates an overview 100 of an embodiment of a mobile media and information capture and management system (MMICMS) 200 (as shown by the dotted box) within an exemplary environment, constructed and operated in accordance with various aspects of the present disclosure. In the embodiment shown in FIG. 1, the exemplary environment 100 includes a mobile worker 101, an office worker 102 and a management worker 103 of a single organization. These various "workers" may represent any suitable user(s) of the systems and methods described herein. It should be understood that although FIG. 1 depicts a single mobile worker 101, a single office worker 102, and a single management worker 103, each of these entities may represent more than one entity, such as for example, one or more mobile workers 101, etc. Additionally, each of the mobile worker 101, office worker 102, and management worker 103 may be from different organizations.

According to one embodiment, the mobile worker 101 operates one or more mobile devices 110a to capture media and field information at potentially different geographical locations. The one or more mobile devices 110a may be any suitable mobile device that may capture media or other suitable data (e.g., pictures, videos, audio, location data, weather information, specific sensor information such as PH levels, etc.), including, for example, mobile phones (e.g., with cameras, etc.), tablets, digital cameras, and other appropriate sensors. The mobile device 110a may include any suitable components for capturing and processing data such as, for example, one or more processors, one or more removable or non-removable memory components, one or more display devices, one or more accelerators, one or more gyroscopes, one or more GPS transmitters/receivers, an internal compass, one or more cameras (or other image capturing devices), etc. As shown in FIG. 1, the mobile device 110a may be operatively connected to additional hardware 110b for manual transfer of data (e.g., cables, data input sources, etc.).

Continuing with FIG. 1, the office worker 102 is operatively connected to a transfer module 120 for transferring captured data, a central management module 130 for authenticating, organizing, reporting, and searching captured data, and a filing module 140 for filing captured data. In various embodiments, the mobile worker 102 submits and/or transfers captured data via the transfer process 120 by way of upload or submission to a central management module 130 where the media and information is authenticated, organized, used for reporting and searches. In particular embodiments, the office worker 102 may also completely or partially participate in the submitting and transferring 120 of information. In the embodiment shown, management tasks may include (but are not limited to) routing, sorting, organizing, and naming the media files and managing associated field information processes 130. These various tasks may take a large amount of time to complete and are manually executed by central or back office staff 102 and/or the mobile worker 101. Once files and information are processed, in various embodiments, files are stored (e.g., filed) and routed 140 to storage 160 for future use 150 or to other business management systems 160 for immediate further business use 150. Storage 160, other business management systems 170, etc. may be cloud computing based or based on leased or owned physical servers.

According to one embodiment of the present disclosure, a backend management module 130 of the MMICMS 200 is installed on a physical server or a general purpose computer in that is connected to an IT infrastructure. According to another embodiment, a management module 130 of the MMICMS 100 is hosted on a virtual computer (connected to an IT infrastructure). According to yet another embodiment, a management module 130 of the MMICMS 200 resides in a third party server in a cloud computing environment and communicates with devices and client applications via networks. Although not shown in FIG. 1, it should be understood by one of ordinary skill in the art that IT infrastructure may include one or more gateways/firewalls that provide information security from unwarranted intrusions and cyberattacks and also ensures operating compatibility between an IT infrastructure and networks. Generally, in those embodiments in which a firewall is used, the MMICMS operates behind the firewall of the organization.

Exemplary System Architecture

FIG. 2A illustrates an exemplary architecture of the MMICMS 200, constructed and operated in accordance with various aspects of the present disclosure. According to one exemplary embodiment, an organization has multiple mobile devices 110a, with client applications 215, at different geographical locations. Such client applications are interconnected and managed through the backend management module 220. According to the embodiment shown, the MMICMS captures, manages and controls the flow of media files and information (metadata) to storage repositories 160 and other management systems 170 with network connectivity.

As will be understood and appreciated, these mobile device(s) 110a and client applications 215 could also be co-located at the same geographic location. For example, the devices could be used for different purposes and on the same location, or they may be distributed geographically at various locations. A device and client application may be in Atlanta, another device and client application may be in Tokyo, and so on.

Additionally, as will be understood, many types of devices contain central processing units (CPUs) or microprocessors that are driven by multiple software programs and/or operating systems, for example on any mobile phone, tablet, laptop computer, PDA, and other similar devices. Examples of common operating systems include (but are not limited to) iPad™ iOS, iPhone™ iOS, Android™, MICROSOFT WINDOWS™, APPLE™ OS X™, or any UNIX/LINUX™ based operating system, and other similar operating systems. It will be further understood that mobile devices, for example, PCs running multiple operating systems like WINDOWS 7™, LINUX™, WINDOWS XP™, etc. may also be used by embodiments of the MMICMS.

It will also be understood that generally a mobile device contains micro and other types of chips that automate collection of basic field information such as global-positioning system location, date, time, etc. As shown, for example, in FIG. 2A, hypothetical mobile device(s) 110a includes one or more client applications 215, which can be easily installed from application distribution platforms (e.g., Apple's App Store, Google's Play Store). The one or more client applications 215 may enable easy aggregation of device-based information and enable capture of media files by using mobile device 110a hardware (e.g., a digital camera or other device). In particular embodiments, the client application 215 accesses the hardware, transfers a captured media file (e.g., a photo taken by a user) to the client application 215, and automatically embeds captured metadata (e.g., both field information and device generated basic information) into the captured media file. The system may be configured to embed metadata as XMP metadata (including in a PDF of a MediaRichReport or custom report, as further discussed below). The system may also be configured to separately store XMP metadata (e.g., not embedded in another file) for easy user access to the metadata, searching, etc.

As will be understood by one of ordinary skill in the art, various types of electronic devices can be used within a given MMICMS, and there is no limitation imposed on the number of devices, device types, brands, vendors, and/or manufacturers that may be included within an organization or the organization's MMICMS. Further, no limitation is imposed on the number of mobile device(s) 110a or client applications 215 that can be used and managed by the MMICMS, or the locations of such mobile devices and client applications.

According to one embodiment of the present disclosure, a backend management module 220 of the MMICMS 200 is installed on a physical server or a general purpose computer that is connected to an IT infrastructure. According to another embodiment, a backend management module 220 of the MMICMS 200 is hosted on a virtual computer (connected to an IT infrastructure). According to yet another embodiment, a backend management module 220 of the MMICMS 200 resides in a third party server in a cloud computing environment and communicates with devices and client applications via one or more networks. Although not shown in FIG. 2A, it can be understood that IT infrastructure may include one or more gateways/firewalls that provide information security from unwarranted intrusions and cyber-attacks and also ensures operating compatibility between an IT infrastructure and networks. Generally, in those embodiments in which a firewall is used, the MMICMS 200 operates behind the firewall of the organization.

As shown in FIG. 2A, an embodiment of the MMICMS 200 includes a capture module 210 which includes the mobile device 110a, client application(s) 215, and backend management module 220 for synchronizing information between the mobile device(s) 110a related to the same company or system and in multiple geographically distributed locations. Generally, the MMICMS capture module 210 and the client applications 215 may include various software algorithms and sub-modules that enable users to easily capture media files and annotate the captured media files with text, table-driven entries, GPS coordinates, date stamp, time stamp, tags, etc., and automatically synchronize transfer, index, organize and route the media files to the specific electronic destination including (but not limited to) electronic folders, electronic databases, etc., in including (but not limited to) the backend management module 220, storage repositories 160, other management systems 170 with network connectivity, etc.

In various embodiments, the synchronization process is optimized for speed and security of the data, including a SmartUpload method (as further discussed herein), and completed after a server-based authentication of the users' mobile device and comparison of the metadata (including but not limited to GPS coordinates, date stamp, time stamp, etc.) captured and associated with the electronic media file against other centrally stored data maintained in the backend management service 228 of the backend management module 220. As will be understood, the MMICMS backend management service 228 stores various types of device data, field information and data, usage data, predetermined file and metadata management commands, location information, and other information relating to a user's mobile device and/or the MMICMS. Additionally, MMICMS 100 client applications 215 may also enable fast and efficient search and identification of the appropriate media file(s) by matching metadata embedded within the file. In particular embodiments, the backend management module web portal 224 also enables similar searching through a web based dashboard interface.

As will be understood by a person skilled in the art, remote media files and metadata management generally entails two way communication of media file and metadata related information between client applications 215 and backend management service 228, storage repositories 160, other management systems 170, etc. This communication may proceed over a network using a variety services, such as a web-deployed service with client/service architecture, a corporate Local Area Network (LAN) or Wide Area Network (WAN), or through a cloud-based system.

In accordance with aspects of the present disclosure, when an embodiment of the MMICMS 200 is running under normal operating conditions, information is continually retrieved from mobile device(s) 110a at periodic intervals by MMICMS backend management module 220. In various embodiments, information is pushed from the mobile device(s) 110a to the MMICMS backend management module 220 via a standard HTTP+REST approach. Additionally, according to particular embodiments, when the MMICMS 200 is first installed and/or configured, or when new devices are introduced for the first time, information retrieved from mobile device 110a and associated client applications 215 is imported automatically into the MMICMS 200 via the MMICMS backend management service 228. In some embodiments, the system is configured to periodically determining whether the mobile device(s) 110a is configured to transmit and receive data to and from the MMICMS 200 (e.g., "talk" to the MMICMS 200).

In further embodiments, the first time that a mobile device 110a is configured to transmit data to and from the MMICMS 200, the synchronization operation pushes all relevant data to MMICMS 200. In these embodiments, after the first synchronization, information is periodically (e.g., virtually continuously) synchronized and updated in order to ensure all device data is up-to-date. Examples of such information includes device type, model number, manufacturer, network name/address associated with an asset, business unit and various such details and device profile attributes. The synchronization process is described in further detail below.

Alternative Exemplary Architecture

FIG. 2B illustrates an overview 200 of an alternative architecture of the MMICMS. In this alternative architecture, the client applications 215 are connected to a third-party cloud server 1020 via a network. In the embodiment shown, the third-party cloud server 1020 is operatively connected to the backend management service 228. This alternate configuration may, in some embodiments, enable a company to use the client applications 215 and backend management service 228 in conjunction with an existing third-party cloud storage service (e.g., Dropbox™, Box.com™, etc.). In this way, in various embodiments, a company can utilize the MMICMS without purchasing new storage servers or the like.

Client Application Architecture

As shown in FIG. 3, an exemplary client application architecture 300 for the client application 215, regardless of the platform, includes a graphical user interface (GUI) and a user interaction engine 301, which, in various embodiments, facilitates the interaction between a user and other parts of the system. According to particular embodiments, the GUI and user interaction engine 301 facilitate capturing and sending media files to the client media storage 308. In further embodiments, the GUI and user interaction engine 301 facilitate capturing and sending annotations to the client metadata database 302. In still further embodiments, the GUI and user interaction engine 301 facilitate embedding or extracting metadata from and to the media file in conjunction with the metadata embedding engine 309.

In various embodiments, a client metadata database 302 stores relevant metadata for the device and/or group of devices, and is used for metadata searching, pivoting, and drill down functionality. According to particular embodiments, client media storage 308 stores relevant media files.

As will be understood by one of skill in the art, the GUI 301, client metadata database 302, and the client media storage 308 generally have a two-way communication with a client synchronization engine 303, which, in various embodiments, is used to facilitate synchronization between the backend management service 228 (FIGS. 2A and 2B) and the client metadata database 302. According to particular embodiments, the client synchronization engine 303 sends and receives metadata to and from the backend management service 228 via a backend database adapter 304. In further embodiments, the client synchronization engine 303 sends and receives media files to and from the storage repository 160 and/or the other management systems 170 through a storage repository service adapter 307 used to connect to third party repositories, usually cloud-based, for media file storage in the cloud. In still further embodiments, the backend database adapter 304 is operatively connected to and communicates with the backend management service 228.

According to particular embodiments, all network based communication with external data sources, both the repository service and the backend service, is based on the standard internet protocols such as HTTP and HTTPS, and when available, using the REST services architectural approach.

Backend Management Service Architecture

FIG. 4, according to one embodiment or the present disclosure, is an example of a backend management service architecture including various web components including (but not limited to) a web application server, a REST services layer 401, which in at least one embodiment, enables HTTPS based access 404 to metadata (e.g., metadata corresponding to metadata stored at one or more the client applications) stored in the backend metadata database 403 with proper authentication and authorization checks. In particular embodiments, a backend synchronization engine 402 contains a backend portion of any synchronization logic and a backend metadata database 403 stores metadata for all devices and groups of devices running on the system.

According to particular embodiments, the backend metadata database 403 stores metadata for one or more devices associated with the system and/or associated with a particular project. In various embodiments, the system indexes stored metadata in a searchable column format such that a user can search and fetch particular metadata and/or media associated with the stored metadata. In one or more embodiments, the system indexes files according to the following hierarchy: project, date, device, location, and tag. It should be understood that the system may be configured to index files in any other suitable hierarchy.

As will be understood by one of ordinary skill in the art, incoming HTTPS requests 404 are originated from the client applications 215. In these (and other) embodiments, the backend synchronization engine 402 contains the server-side part of the logic implemented in the backend database adapter 304 in the client applications 215. Authentication and authorization checks are implemented using the standard HTTP authentication mechanism. In various embodiments, each mobile device is issued an access token by MMICMS 200 when doing the initial setup of the device. In these (and other) embodiments, the token is then used in all subsequent communication between the mobile device(s) 110 and the MMICMS 200. According to particular embodiments, if the token sent by the device matches the token information stored by the MMICMS, the system is configured to authenticate and authorize the device.

FIGS. 8A and 8B depict screenshots of an exemplary MMICMS 200 backend management module 220, web portal 224, and user interface 800. These figures are described in more detail below.

Exemplary Operations

According to various embodiments, FIGS. 5A-5J depict exemplary operations of the MMICMS. In particular, FIG. 5A is a flowchart showing an exemplary overall synchronization process 500 executed by the synchronization engine 303. FIGS. 5B-5J depict exemplary sub-processes or micro-operations that, in particular embodiments, function as part of the overall process shown in FIG. 5A. FIG. 6 depicts an exemplary search operation of the MMICMS.

Turning to FIG. 5A, the embodiment shown includes an exemplary synchronization process, which may (among other things) mitigate performance problems of slow network connections. According to various embodiments, the main algorithm for the exemplary synchronization process includes a number of different micro-operations (e.g., sub-processes), which are well-defined and queued in a synchronization queue, as further discussed in relation to FIGS. 5B-5J. Since most modern smart mobile devices have multiple CPU cores to achieve better performance, a multi-threaded approach is used. Thus, the exemplary process shown in FIG. 5A is executed in multiple concurrent threads on a mobile device. To achieve this functionality, in various embodiments, a standard thread pool mechanism provided by mobile operating systems is used. It should be understood that, in particular embodiments, the synchronization process 500 is triggered automatically by the client application 215.

Continuing with FIG. 5A, according to one embodiment, the system 500 begins at step 501 by executing a next micro-operation in the synchronization queue (e.g., a first micro-operation or subsequent micro-operation). Each micro-operation is further discussed below in FIGS. 5B-5J.

At step 502, the system determines whether the synchronization queue is empty. The system may be configured to determine whether the synchronization queue is empty in any suitable way know by one of ordinary skill in the art.

Upon determining that the synchronization queue is empty, the system, at step 503, determines whether a new operation was added to the synchronization queue (e.g., as the result of a user's interaction with a client application). Upon determining that no new operation was added to the synchronization queue, the system returns to step 501. Upon determining that a new operation was added to the synchronization queue, the system adds the following sub-processes (e.g., micro-operations) as needed to the synchronization queue: UserInfo Operation at step 504, SyncMediaRichReport Operation at step 505, SyncLocalMedia Operation at step 506, SyncRemoteMetatdata Operation at step 507, and/or FetchMissingThumbnails Operation at step 508. Each of these sub-processes are discussed in detail below.

Exemplary UserInfo Operation

In various embodiments, when the UserInfo Operation at step 504 is fetched and executed, the system determines whether a device currently logged into the system has permission to access the system. The system may be configured to determine whether the device logged into the system has permission to access the system in any suitable way, such as, for example, by verifying a user name and password, by verifying an identifier associated with the device (e.g., a MAC address, and IP address, etc.), by verifying a token (as discussed herein), etc.

Exemplary SyncMediaRichReport Operation

When the SyncMediaRichReport operation is added to the synchronization queue (e.g., step 505), the process shown in FIG. 5B (e.g., the SyncMediaRichReport Operation 520), according to one embodiment of the present disclosure, is triggered and executed by the main synchronization process at step 501. Beginning with step 510, the system determines whether there are any MediaRichReports (e.g., any reports created via the MMICMS that included one or more media items (pictures, videos, etc.)) created by a local user to be synchronized. Upon determining that there are not any MediaRichReports created by the local user to be synchronized the sub-process ends.

The MediaRichReport may include any suitable data, information, and files. In various embodiments, the MediaRichReport includes user entered data, such as answers to particular questions and/or prompts (e.g., "what is the project name," "what is today's date," "title of the report", etc.). In some embodiments, the MediaRichReport includes device recorded data (e.g., location, address, and/or time based on various components, sensors, and device information. In further embodiments, the MediaRichReport includes data calculated by the device from any suitable source, including metadata accessible by the device (as further discussed herein). In still further embodiment, the MediaRichReport includes one or more media files with (or without) embedded metadata, such as annotations, comments, etc.

It should be understood from discussions herein that a MediaRichReport may be in any suitable format and may include any suitable amount and type of information. In various embodiments, the MediaRichReport has a pre-defined structure (stored on a server) and may be included with the MMICMS (e.g., a report including 16 photos, five questions, and project address information). In further embodiments, the MMICMS may allow a user to configure one or more custom reports which includes a user-defined number of questions (e.g., two, including, for example, "title of the report" and "other information"), a user-defined number of media files (e.g., one photo), and/or device information such as location.

In response to determining that there is at least one MediaRichReport to synchronize at step 511, the system finds the media (e.g., pictures, video, audio recording, etc.) included in the at least one MediaRichReport. In various embodiments the system is configured to find the media included in the at least one MediaRichReport by searching the metadata of the at least one MediaRichReport. In further embodiments, the system is configured to find the media included in the at least one MediaRichReport by searching an index associated with the MediaRichReport, where the index includes any media included with the at least one MediaRichReport. In still further embodiments, the system is configured to find the media included in the at least one MediaRichReport by searching a URL associated with a media object included in the MediaRichReport.

At step 512, the system adds the UploadMediaRichReportMedia operation to the synchronization queue. When this operation is fetched and executed in step 501, the UploadMediaRichReportMedia mechanism is executed. This mechanism is described in FIG. 5C.

At step 513, the system fetches one or more public URLs for each of the media files embedded in the report. According to particular embodiments, when this operation is fetched and executed in step 501, the GetPublicMediaUrls mechanism is executed. In at least one embodiment, the GetPublicMediaUrls is implemented on a repository system (e.g., repository 160). It should be understood that if a repository system does not implement the GetPublicMediaUrls operation, this step may be skipped.

In various embodiments, the GetPublicMediaUrls operation generates a publicly available URL to a resource which can then be linked in the report and allow the user to access the original media file from the report itself. In various embodiments, the system additionally adds the UploadMediaRichReport 525 micro operation to the synchronization queue. This micro operation is described in FIG. 5G.

At step 515, the system determines whether there are more MediaRichFiles to synchronize. In response to determining that there are more MediaRichFiles to synchronize the system is configured to return to step 511. In response to determining that there are not more MediaRichFiles to synchronize the system ends the sub-process (micro-operation).

Exemplary UploadMediaRichReportMedia Operation

As is further described in FIG. 5C, according to one embodiment of the present disclosure, an UploadMediaRichReportMedia 526 operation is used to upload media included in the MediaRichReport. At step 570, the system is configured to perform a synchronization check for a mobile device. In various embodiments, the system is configured to perform the synchronization check by determining whether there is WiFi available for the mobile device and/or whether the mobile device is connected to the WiFi. In response to determining that WiFi is available, the system is configured to continue to step 571. In response to determining that WiFi is not available, the system is configured to determine whether the mobile device is configured to receive and transmit data over a cellular connection (e.g., the mobile device is set such that a "synchronization over data connection" option is activated). As will be understood by one of ordinary skill in the art, the system may be configured to perform the synchronization check via any other suitable connection mechanism(s).

At step 571, the system is configured to perform a device configuration check. In various embodiments, the device configuration check includes the client application (e.g., client application 215) calling the server endpoint with authentication information, information about the state of the device such as the client application version, etc.

On the server side, the system determines whether the device is permitted to connect to a corresponding server application. In various embodiments, the system is configured to determine whether the device is permitted to connect to the corresponding server application based on information stored by the server and information included with a request to connect to the server application.

According to particular embodiments, in response to performing the device configuration check, the server transmits various data and information to the mobile device. Such data and information may include configuration data such as information whether the device has a permission to connect to the system or configuration information for the device and reports such as team logo, project-address geographical boundaries, custom photo report configuration, etc. Because the system is configured to perform the configuration check upon each synchronization operation, in at least one embodiment, each change on the server configuration will be propagated to the mobile device before the mobile device transmits any data to change any server side information. Thus, changes on the server become effective to the mobile device(s) at each synchronization and/or device configuration check.

At step 572, in response to determining that the mobile device is permitted to connect to the server application, the system is configured to upload the media to the server. At step 573, the system is configured to determine whether the media was uploaded successfully. In response to determining the media was not uploaded successfully, at step 573, the system ends the micro-operation. In such a circumstance, further system checks or analysis (not shown) may be performed to determine the reason the media was not uploaded successfully. In response to determining that the media was uploaded successfully, at step 574, the system is configured to mark the media as uploaded.

Exemplary UploadMediaRichReport Operation

According to particular embodiments, the MMICMS is configured to enable a user to convert a report (e.g., a MediaRichReport) to portable document format (PDF). The report in PDF may be simpler to store and send to others (e.g., via email). An exemplary process for generating and uploading a PDF MediaRichReport (or other suitable report) is discussed in detail below.

Turning to FIG. 5D, in various embodiments, an UploadMediaRichReport operation 525 is used to generate and upload a PDF report with relevant media files, answers to questions, comments, annotations and all other information that was captured and/or entered in the report.

At step 575, the system is configured to perform a synchronization check for a mobile device. In various embodiments, the system is configured to perform the synchronization check by determining whether there is WiFi available for the mobile device and/or whether the mobile device is connected to the WiFi. In response to determining that WiFi is available, the system is configured to continue to step 576. In response to determining that WiFi is not available, the system is configured to determine whether the mobile device is configured to receive and transmit data over a cellular connection (e.g., the mobile device is set such that a "synchronization over data connection" option is activated). As will be understood by one of ordinary skill in the art, the system may be configured to perform the synchronization check via any other suitable connection mechanism(s).

At step 579, the system performs a device configuration check to determine whether the mobile device has permission to connect to the server application. The device configuration check 579 may be, in various embodiments, substantially similar to the configuration check as described above in step 571.

In response to determining the mobile device has permission to connect to the server application, the system, at step 577 determines whether all media is uploaded (e.g., all media is uploaded from step 572 of FIG. 5C).

In response to determining that all media is uploaded, at step 578, the system is configured to generate a PDF report of the uploaded report. The system may be configured to generate the PDF report of the uploaded report in any suitable way, as will be understood by one of skill in the art.

At step 579, the system is configured to upload the PDF report. At step 580 the system determines whether the upload of the PDF report was successful. In response to determining that the upload of the PDF report was successful, the system, at step 581, removes the report data and temporary media from a pending report list.

Exemplary SyncLocalMedia Operation

Turning to FIG. 5E, the SyncLocalMedia 530 sub-process is initiated when the SyncLocalMedia sub-process 506 is executed at step 501 of FIG. 1. At step 531, the system searches for unsynchronized local media files on the mobile device. In various embodiments, the system is configured to search for local media files that have not been synchronized by any standard database search operation supported by mobile devices. At step 532, the system determines whether there are local media files that have not been synchronized. In response to determining that there are no local media files that have not been synchronized, the operation is terminated.

In response to determining that there is at least one local media file that has not been synchronized at step 533, the system synchronizes the at least one local media file. At step 534, the system determines whether the at least one media file exists in a remote repository (e.g., repository service 160). In response to determining that the at least one media file does not exist in the repository, the system, at step 535, adds a SmartMediaUpload micro-operation to the synchronization queue. The mechanism of the SmartMediaUpload micro-operation is described in FIG. 5F. At step 536, the system adds an UploadMediaMetadata micro-operation for the at least one local media file to the synchronization queue (to be further discussed below in conjunction with FIG. 5J). At step 537, the system determines whether there is more media to be synchronized. In response to determining that there is more media to be synchronized the system returns to step 533. In response to determining that there is not more media to be synchronized the system ends the operation.

Exemplary SmartMediaUpload Operation

FIG. 5F depicts a SmartMediaUpload 527 operation, according to one embodiment of the present disclosure, for uploading the at least one local media file (as discussed in relation to FIG. 5E, above) to the repository (e.g., repository 160). At step 582, the system is configured to perform a synchronization check for the mobile device. In various embodiments, the system is configured to perform the synchronization check by determining whether there is WiFi available for the mobile device and/or whether the mobile device is connected to the WiFi. In response to determining that WiFi is available, the system is configured to continue to step 591. In response to determining that WiFi is not available, the system is configured to determine whether the mobile device is configured to receive and transmit data over a cellular connection (e.g., the mobile device is set such that a "synchronization over data connection" option is activated). As will be understood by one of ordinary skill in the art, the system may be configured to perform the synchronization check via any other suitable connection mechanism(s).

At step 591, the system performs a device configuration check. In various embodiments, the mobile device transmits identification data to the server. According to particular embodiments, in response to receiving the transmitted identification data, the server returns relevant device configuration information, such as, for example, one or more permissions to use specific features and/or functionality of the application. At step 583, the system determines whether the mobile device has the permission to continue synchronization based on the information received from the mobile device at step 591.

At step 584, the system determines whether the media file has completed an upload process. In various embodiments, the system determines whether the media file has completed the upload at its maximum quality (e.g., maximum stored file size, which may be expressed in kilobits, megabits, gigabits, etc.). In response to determining that the media file has not completed the upload process, the system, at step 585, determines whether the network connection is adequate to upload the file at the file's current size. In various embodiment, the system is configured to determine whether the network connection is adequate to upload the file at the file's current size by, for example, determining the network upload speed and size of the file and comparing a ratio of the upload speed and file size to a corresponding table (e.g., where certain ratios are adequate and other ratios are not). In particular embodiments, the system is configured to determine whether the network connection is adequate in any other suitable way as would be understood by one skilled in the art.

At step 586, based at least in part on determining that the network connection is not adequate (e.g., at step 585), the system adjusts the quality (e.g., file size) of the media file quality based on the detected network connection speed (e.g., in various embodiments, the system is configured to adjust and upload smaller files for the slower the network connections). According to particular embodiments, the quality of the media file is selected based on the file size. In at least one embodiment, the upload of a single photo should not take more than 20 seconds (e.g., the size of the photo is determined based on "what can be uploaded in 20 seconds"). For example, if the current network connection supports uploads at 1 Mb/sec, the system is configured to (in this example) select a media file quality of about 200 kilobits. It should be understood that the previously discussed parameters are meant to be exemplary only. One of ordinary skill in the art will readily understand that other parameters may be used to adjust an upload and/or synchronization process.

It should be understood that the system, in various embodiments, is configured to monitor the upload speed of the media file regularly (e.g., substantially constantly). In this way, the system can adjust to abrupt changes in upload speed as described herein.

In response to determining that no better quality can be uploaded with the current network speed, the system continues to step 591. At step 587, the system determines whether the upload described at step 586 was successful (e.g., if the media file was uploaded). In response to determining that the media file was successfully uploaded, the system, at step 588, marks the uploaded version in a database with an appropriate indicator indicating that the media was successfully uploaded. In response to determining that the file was not successfully uploaded at step 586, the system ends the micro-operation.

At step 591, the system determines whether the media file name and/or directory name match the metadata in the media file (e.g. project name, location name, etc.). In response to: 1) determining that the media file name and/or directory name match the metadata in the media file; or 2) determining that the media file name and/or directory name do not match the metadata in the media and changing the file name and/or direction name to match the file name and directory name in the metadata, the system, at step 592, determines whether the file name and/or directory name was successfully changed. In response to determining that the file name and/or directory name was successfully changed to match the file name and/or directory name in the metadata of the media file, the system, at step 593, marks the media file as renamed in the database.

The system may route one or more files (e.g., media files, combined media files, etc.) to specific locations (e.g., folders), based on one or more preferences of the user. In some embodiments, the system, with permission from the user (e.g., via user preferences), may automatically route a file to specific location based on metadata associated with the file (e.g., the metadata indicates a specific project and geographic location associated with the file and the system is configured to route the file to a folder named after the project and to a sub-folder of the project folder based on the geographic location, for example). In at least one embodiment, the system is configured to determine whether the appropriate file location exists (e.g., if the project folder has been created). In one or more embodiments, upon determining that the appropriate file location does not exist, the system may be configured to automatically generate the appropriate file location (e.g, folders and/or sub-folders) based on the metadata (e.g., the system may be configured to generate a project folder based on the project information metadata associated with a particular file). It should also be understood that after creating a folder and/or sub-folder, the system may be configured to automatically route similar files (e.g., files with similar or substantially the same metadata) to the same system-created folder and/or sub-folder. In other embodiments, the system may enable a user (via one or more user preferences settings) to manually route a file to a folder and/or to enable a user to manually create a folder or sub-folder to store a file.

Exemplary SyncRemoteMetadata Operation

Turning to FIG. 5G, the system preforms a SyncRemoteMetadata micro-operation 540, which is executed by the system when the add SyncRemoteMetadata operation 507 is executed at step 501 (FIG. 5A).

At step 541, the system is configured to perform a synchronization check for the mobile device. In various embodiments, the system is configured to perform the synchronization check by determining whether there is WiFi available for the mobile device and/or whether the mobile device is connected to the WiFi. In response to determining that WiFi is available, the system is configured to continue to step 542. In response to determining that WiFi is not available, the system is configured to determine whether the mobile device is configured to receive and transmit data over a cellular connection (e.g., the mobile device is set such that a "synchronization over data connection" option is activated). As will be understood by one of ordinary skill in the art, the system may be configured to perform the synchronization check via any other suitable connection mechanism(s).

At step 542, the system performs a device configuration check. In various embodiments, the mobile device transmits identification data to the server. According to particular embodiments, in response to receiving the transmitted identification data, the server returns relevant device configuration information, such as, for example, one or more permissions to use specific features and/or functionality of the application.

At step 543, the system fetches remote metadata from the backend module using an HTTPS connection, as described in FIG. 4, for example. In various embodiments, the fetched metadata includes information about one or more media files produced by other mobile devices and/or the same mobile device at a different point in time. The fetched metadata may include any suitable information, including, but not limited to a location of a particular media file within the storage repository, a timestamp of the particular media file, one or more annotations and/or tags that may have been assigned to the particular media file, one or more GPS coordinates, project names, addresses, comments, and/or information regarding the identity of a device which produced the particular media file, and, where the particular media file is a photograph, information about the thumbnail of the photo, etc. It should be understood that various metadata may be used for searching and/or displaying various media via a web portal or via the client application.

At step 544, the system determines whether the remote metadata was successfully fetched (retrieved). In response to determining that the remote metadata was successfully fetched, the system, at step 545, inserts the remote metadata into a local database of a requesting mobile device.

It should be understood that the local metadata database may contain metadata in the same format as the remotely stored metadata. It should be further understood that the remote metadata database is, in at least one embodiment, a centralized source for all media metadata in the system and the local metadata database is synchronized with the remote database.

Exemplary FetchMissingThumbnails Operation

In various embodiments, the MMICMS system is configured to download thumbnail previous of various media files that are associated with a particular project (e.g., a user may have access to relevant media for a particular project, even though said media was captured by another user). FIG. 5H depicts an exemplary FetchMissingThumbnails micro-operation 550 which is executed when the FetchMissingThumbnails operation 508 is executed at step 501 of FIG. 5A. At step 551, the system searches local media file storage for any missing thumbnails. At step 552, the system determines whether at least one missing thumbnail was located (e.g. at step 551). In response to determining there is at least one missing thumbnail, the system, at step 553 adds a DownloadThumbnail micro-operation to the queue (as further described below and shown in FIG. 5I). At step 554, the system determines whether there are any other media files for which thumbnails are missing. In various embodiments, the system is configured to determine whether there are any other media files for which thumbnails are missing by checking whether a thumbnail file defined in the local metadata database exists in the local thumbnail folder ("local media database" as further described above).

Exemplary DownloadThumbnail Operation

FIG. 5I depicts an exemplary DownloadThumbnail micro-operation 560. At step 561, the system is configured to perform a synchronization check for the mobile device. In various embodiments, the system is configured to perform the synchronization check by determining whether there is WiFi available for the mobile device and/or whether the mobile device is connected to the WiFi. In response to determining that WiFi is available, the system is configured to continue to step 562. In response to determining that WiFi is not available, the system is configured to determine whether the mobile device is configured to receive and transmit data over a cellular connection (e.g., the mobile device is set such that a "synchronization over data connection" option is activated). As will be understood by one of ordinary skill in the art, the system may be configured to perform the synchronization check via any other suitable c At step 562, the system performs a device configuration check. In various embodiments, the mobile device transmits identification data to the server. According to particular embodiments, in response to receiving the transmitted identification data, the server returns relevant device configuration information, such as, for example, one or more permissions to use specific features and/or functionality of the application.

At step 563, the system downloads a thumbnail from the repository (e.g., repository 160). In various embodiments, the system is configured to download the thumbnail via a standard HTTP download operation, which is initiated by the mobile device using standard HTTP infrastructure provided by the mobile device operating system. At step 564, the system determines whether the thumbnail download was successful (e.g., at step 563). In response to determining the thumbnail download was successful, the system, at step 565, marks the thumbnail as successfully downloaded. In response to determining the thumbnail download was not successful, the system, at step 566, saves an error message to the local metadata database.

Exemplary UploadMediaMetadata Operation

An exemplary UploadMediaMetadata operation 528 is depicted in FIG. 5J. The UploadMediaMetadata operation 528 uploads metadata to the backend module (e.g., backend module 220). In various embodiments, the metadata may be related to any suitable type of file, such as, one or more photo files, one or more audio files, one or more video files, one or more text files (e.g., a text report), one or more combination files (e.g., a file with text and another type of media), etc.

At step 594, the system is configured to perform a synchronization check for the mobile device. In various embodiments, the system is configured to perform the synchronization check by determining whether there is WiFi available for the mobile device and/or whether the mobile device is connected to the WiFi. In response to determining that WiFi is available, the system is configured to continue to step 595. In response to determining that WiFi is not available, the system is configured to determine whether the mobile device is configured to receive and transmit data over a cellular connection (e.g., the mobile device is set such that a "synchronization over data connection" option is activated). As will be understood by one of ordinary skill in the art, the system may be configured to perform the synchronization check via any other suitable c At step 595, the system performs a device configuration check. In various embodiments, the mobile device transmits identification data to the server. According to particular embodiments, in response to receiving the transmitted identification data, the server returns relevant device configuration information, such as, for example, one or more permissions to use specific features and/or functionality of the application. According to particular embodiments, the device configuration check operation is completed by the backend module.

At step 596, the system determines whether a particular media file (e.g., a photo) has been uploaded/synchronized. In various embodiments, the system is configured to determine whether an indicator (e.g., a flag) for that particular media file is stored in the local database. In response to determining the particular media file has been uploaded, the system, at step 597, uploads metadata of the particular media file to the backend module. At step 598, the system determines whether the upload of the metadata was successful. In response to determining the upload was successful, the system, at step 596, marks the particular media file as synchronized. In particular embodiments, the system is configured to mark the particular media file as synchronized by setting a "synchronization flag (or any other suitable indicator) associated with the particular metadata file in the local database.

Exemplary Search Operation

Aspects of present disclosure relate to copying and using captured metadata (e.g., metadata captured by one or more users) to facilitate fast searching and identification of one or more electronic media files (e.g., with matching metadata used for the search embedded within the file). It should be understood that all database searches described herein may be implemented using standard SQL-based database access.

FIG. 6 is a flowchart showing a summary of high level, computer-implemented method of exemplary search process 600, performed by various software modules and engines of the MMICMS. At step 601, the system receives one or more search terms from a user. At step 602, the system searches the local metadata database for the one or more search terms. In at least one embodiment, the system is configured to conduct the search using a standard SQL (Structured Query Language) query. According to particular embodiments, the system is configured to search all available metadata information (such as, but not limited to location, annotations, comments, tags etc.) of stored media files.

At step 603, the system displays one more thumbnails of the matched media files (e.g., one or more media files with metadata matching the one or more search terms) to the user. For example, the matched media file may be a photo entry in the database that conforms to the SQL query described in step 602.

At step 604, the system receives a selection of at least one of the one or more displayed thumbnails (e.g., the one or more displayed thumbnails at step 602) from the user. At step 605, the system determines whether the selected at least one thumbnail is available in the local media storage. In various embodiments, the system is configured to determine whether the selected at least one thumbnail is available in the local media storage by checking whether the local file storage contains the file that is contained in the database rows matched in the SQL query described at step 602.

In response to determining that the selected at least one thumbnail is not available in the local media storage, the system, at step 606, downloads the selected at least one thumbnail from the repository to the local storage. At step 607, the system is configured to display the selected at least one thumbnail to the user.

In various embodiments, since the local metadata database is synchronized whenever possible, each search request by the user needs only to be processed locally. This may make the search much faster and responsive to the user. Also, this process may enable the user to search data from the images taken by other devices without actually downloading all images. In various embodiments, the system is configured to download the full image to the client and display to the user only when a search result is not available locally.

According to one embodiment of the present disclosure, management of such a wide variety of distributed assets further includes applying various policies and rules for purposes of providing organization efficiency. In at least one embodiment, these various policies and rules are stored on the backend management service and include, but are not limited to, rules for assigning project/account names, addresses etc. based on the current context of the capture module such as GPS coordinates, weather information, vicinity of other micro-location detecting devices etc., rules for allowing upload/download of data to the repository system to specific devices, and rules for allowing associating certain data to specific projects/addresses.

Exemplary User Experience

FIGS. 7A-7G are exemplary screenshots depicting various aspects of the present disclosure. In general, these screenshots show a GUI 700 organized with one or more buttons (e.g., four) in the top line navigation with one or more buttons (e.g., two) in the side line navigation. According to various embodiments the GUI enables a user to execute a predetermined and limited number of clicks, such as three or fewer, for a required action or result, all with the goal of achieving maximum simplicity, speed and ease of use.

In general, FIG. 7A depicts the GUI 700 home screen 710. In the embodiment shown, the home screen 710 includes marketing space and various navigational functions, such as a button to access a camera 714, a button to access a MediaRichReport 715, a button to access a gallery (e.g., a photo gallery), settings, instructions, etc. FIG. 7B depicts a capture screen 720 of the GUI 700. According to the embodiment shown, the capture screen 720 includes side line navigation to add field information 725 to a photo (e.g., a photo captured with a mobile device camera).

FIG. 7C depicts an exemplary embodiment of a preview screen 740 of the GUI 700. The preview screen 740, in the embodiment shown, includes a view of captured media (e.g., the photo captured and discussed above at FIG. 7B). The preview screen 740 may also include (as shown) an area to view and/or change field information (e.g., field information 725 (FIG. 7B)). FIG. 7D depicts an exemplary PDF preview screen 750, which, in various embodiments, may be used to view a PDF version of a MediaRichReport as discussed herein. In one or more embodiments, a user, from the exemplary PDF preview screen 750 may email the PDF shown via the email button 753.

FIG. 7E shows an exemplary MediaRichReport Screen 760 of the GUI 700. The exemplary MediaRichReport Screen 760, in the embodiment shown, includes an area to add report information 762, various media 763, and one or more textual summaries to the report (e.g., at 764 and 765). FIG. 7F depicts an exemplary gallery screen with search 770. In the embodiment shown, the gallery screen and search 770 includes one or more thumbnails 722 of various media and a search bar 776 where a user, in particular embodiments, may search for media by entering search terms into the search bar 776. As discussed herein, in response to the user entering one or more search terms, the system may be configured to search metadata associated with stored media to locate the one or more search terms.

FIG. 7G depicts an exemplary gallery screen with map view 775. In the embodiment shown, the gallery screen with map view 775 includes a map media view 772, media thumbnails 722 and various top-line navigation buttons.

FIG. 8A shows an exemplary screenshot 800 of a backend management module web portal 224 with a login page 810, login instructions 802, a login field 803, a password field 804, a login button 805, a cancel button 806, and a registration button 807. Generally, this exemplary web portal page enables a user to register their mobile device for the service.

FIG. 8B depicts a second exemplary screen shot 800 of the backend management module web portal 224 showing the management dashboard page 820. The management dashboard page 820, in various embodiments, enables management of one or more devices (e.g., device 824), field names, configuration, marketing aspects, and administration, and enables changing rules and policies for management of information and metadata. According to particular embodiments, the management dashboard page 820 further enables management of indexing or naming convention, organizing, routing and filing files and information in one or more storage repositories 160. According to a particular embodiment, such information may include (but is not limited to) alerts about newly added or recently changed files, or information regarding other management systems 170. In further embodiments, the management dashboard page 820 may enable a user to manage work flows outside of the MMICMS, such as work order generation and submission, request for information (RFI) generation and submission, and generate different types of reports, other actions, etc. In still further embodiments, the management dashboard page 820 may enable a user to route one or more files (e.g., media files, combined media files, etc.) to specific locations (e.g., folders). In some embodiments, a file may be automatically routed to specific locations based on metadata associated with the file (e.g., the metadata indicates a specific project and geographic location associated with the file and the system is configured to route the file to a folder named after the project and to a sub-folder of the project folder based on the geographic location). It should be understood that the system may be configured to automatically generate such folders and sub-folders based on the metadata (e.g., the system may be configured to generate a project folder based on the project information metadata associated with a particular file).

As shown in FIG. 8B, the exemplary management dashboard page 820 includes many other features and functionality necessary to navigate the management dashboard page 820 including (but not limited to), name of the administrator or user 821 field, a settings button 822, a log out/in button 823, one or more action buttons 827, one or more field values 825, etc.

FIG. 9 depicts an exemplary screenshot of an MMICMS system storage repository web portal user interface. According to one embodiment of the present disclosure, where a user uses a third-party storage service provider, dashboard 900 is organized with conventionally named files and metadata preview portions of the screen around the media. In particular embodiments, the dashboard 900 enables a user to share and set sharing and collaboration rules for individual files and folders (e.g., folders provided by an exemplary third party storage service provider). In a particular example, a national construction firm wants to create an organized photo archive but wants to use their existing third-party cloud storage account (e.g., Box.com™ cloud storage) so they can continue to collaborate on various files. Continuing with this example, the MMICMS enables the national construction company to have multiple devices, at multiple locations, capture different types of media files and automatically, via metadata and MMICMS dedicated connectors: 1) authenticate the visual media files; 2) name the visual media files; and 3) file the visual media files in a predetermined (correct) folder in associated cloud storage accounts connected to the MMICMS.

Exemplary Custom Report Creation

As shown in FIG. 10, in various embodiments, custom photo report functionality 1100 enables application users to define custom reports, similar to the RichMediaReports previously described (e.g., in various embodiments, the custom report is a configurable version of the MediaRichReport discussed above). According to particular embodiments, a custom photo report is configured on the server (e.g., backend) using industry standard JSON notation.

The system may be configured to initialize the custom report process upon receiving an indication from a user to create a custom photo report. In various embodiments, the system is configured to receive an indication that a user has selected a particular option (e.g., "Start a Report" or the like) on the mobile device GUI (e.g., GUI 301 as shown in FIG. 3).

At step 1101, the system performs a device configuration check, where all device permissions and configurations are retrieved from the server, including a custom photo report configuration. In various embodiments, the user is presented with a list of available reports (e.g., downloaded reports) in the GUI. According to particular embodiments, the list of available reports is compiled based on the downloaded custom photo report configuration.

At step 1102, system determines whether the device is permitted to create reports (as reported by the server in the previous step) based on the downloaded permissions and configurations. Upon determining that the system is permitted to create reports, the system downloads the report definition from the server for the report selected at step 1101.

At step 1104, based on the report description downloaded, the system renders the GUI such that the user can interact with (e.g., fill-out, select portions of, annotate, etc.) the selected report. In various embodiments, the GUI is pre-defined to include a number of items in a particular format. For example, as discussed above, the GUI may include two questions and a prompt for a single media file (which may be annotated, tagged, etc.).

At step 1105, the system receives user inputs for the selected report. In various embodiments, the system is configured to finalize the selected report (e.g., with the user's inputs) by creating a PDF of the report. In particular embodiments, the system is configured to finalize the report upon receiving an input from the user (e.g., receiving an indication that the user has selected an "Export to PDF" command, etc.). It should be understood that the system may be configured to create the PDF report by combining the JSON definition of the custom report and the user-entered information (e.g., the answers to the two questions and the media file in the example discussed at step 1104). It should also be understood that, in at least one embodiment, the system is configured to generate the PDF report by generating a temporary PDF file on the local device (the PDF is generated on a mobile device). In these embodiments (and others), the temporary file is deleted once the PDF file is emailed and/or synchronized.

At step 1106, based on the report definition downloaded in step 1104 and the data entered by the user in step 1106, the application renders the report in PDF format and allows the user to email or synchronize the report. The synchronization process is completed in a substantially similar way as other synchronization operations previously described herein.

CONCLUSION

While the foregoing written description of the present systems and methods will enable one of ordinary skill to make and use what is considered presently to be the best mode thereof, those of ordinary skill will understand and appreciate the existence of variations, combinations, and equivalents of the specific embodiment, method, and examples herein. The present systems and methods should therefore not be limited by the above described embodiments, methods, and examples, but by all embodiments and methods within the scope and spirit of the invention.

What is claimed is:

1. A computer-implemented method for processing media files and associated metadata, comprising the steps of:
receiving, at a mobile device, from a backend management server, a plurality of selectable electronic content metadata suggestions, wherein each of the plurality of selectable electronic content metadata suggestions is preconfigured at the backend server, is not a folder location, is not a pathname, and is a textual description of a tangible object;
receiving, via a mobile device, an image file that displays a particular tangible object;
generating, at the mobile device, file creation metadata corresponding to the creation of the image file, wherein the file creation metadata comprises a geographic location of the mobile device, time metadata associated with a time the image file was created, and an identifier associated with the device;
based on the geographic location of the mobile device, the time metadata, and the identifier associated with the device, retrieving a subset of the plurality of selectable electronic content metadata suggestions, wherein each of the subset of the plurality of the selectable electronic content metadata suggestions corresponds to a textual description of a tangible object;
displaying, on the mobile device, the subset of the plurality of selectable electronic content metadata suggestions for selective association by the user with the image file;
receiving, at the mobile device, selection of a particular selectable electronic content metadata suggestion for association with the image file based on the particular tangible object, wherein the particular selectable electronic content metadata suggestion is descriptive of the particular tangible object displayed in the image file;
embedding content metadata corresponding to the particular selectable electronic content metadata suggestion in the image file to create a new image file; and
automatically routing the new image file from the mobile device to one or more particular storage locations at a remote database based on the content metadata embedded within the new image file and the creation metadata.

2. The computer-implemented method of claim 1, wherein:
the mobile device is operatively coupled to a camera; and
the image file is created by the camera.

3. The computer-implemented method of claim 1, the method further comprising automatically generating a report, the report comprising the new image file, the content metadata, and at least one other file in a preconfigured template.

4. The computer-implemented method of claim 3, wherein the report comprises the new image file, the content metadata, the creation metadata, and at least one other file in the preconfigured template.

5. The computer-implemented method of claim 1, further comprising the step of automatically routing the new image file, the content metadata, and the creation metadata from the mobile device to the one or more particular storage locations based on the content metadata.

6. A computer-implemented method for processing media files and associated metadata, comprising the steps of:
receiving, at a mobile device, from a backend management server: a) a plurality of selectable electronic metadata suggestions, wherein each of the plurality of selectable electronic metadata suggestions is preconfigured at the backend server, does not include a pathname, does not include a folder location, and is a textual description of a tangible object located at a physical property; and b) a preconfigured report template, wherein the preconfigured report template is for generating property inspection reports in the preconfigured template;
receiving, via a mobile device, an image file;
generating, at the mobile device, file creation metadata corresponding to the creation of the image file, wherein the file creation metadata comprises an identifier associated with the device, a geographic location of the mobile device, and time metadata associated with a time the image file was created;
based on the identifier associated with the device, the geographic location of the mobile device, and the time metadata, retrieving a subset of the plurality of selectable electronic metadata suggestions, wherein each of the subset of the plurality of the selectable electronic metadata suggestions does not include a pathname, does not include a folder location, and is a particular textual description of a particular tangible object associated with a particular physical property;
displaying, on the mobile device, the subset of the plurality selectable electronic metadata suggestions for selective association by the user with the image file;
receiving, at the mobile device, selection of a particular selectable electronic metadata suggestion for association with the image file;
embedding the particular textual description corresponding to the particular selectable electronic metadata suggestion in the image file to create a new image file;
automatically routing the new image file from the mobile device to one or more particular storage locations at a remote database based on the particular textual description embedded within the new image file, wherein: a) the particular textual description does not include a pathname and does not include a folder location; b) each of the one or more storage locations correspond to one or more of the selectable metadata suggestions; and c) automatically routing the new image file comprises transferring the new image file over a network to the one or more particular storage locations without any user interaction;
automatically generating a property inspection report, wherein the property inspection report comprises the new image file, at least one other file stored at the one or more particular storage locations, and the content metadata in the preconfigured template; and
automatically generating a work order based on the property inspection report, wherein the work order comprises a request to manufacture, service, or repair the particular tangible object associated with the particular physical property based on the embedded particular textual description.

7. The computer-implemented method of claim 6, wherein:
the mobile device is operatively coupled to a camera; and
the image file is an image file created by the camera.

8. The computer-implemented method of claim 6, wherein the property inspection report comprises the new image file, the particular textual description, the creation metadata, and at least one other file in the preconfigured template.

9. The computer-implemented method of claim 6, further comprising the step of automatically routing the new image file, the particular textual description, and the creation metadata from the mobile device to the one or more particular storage locations based on the content metadata.

10. A computer-implemented method for processing image files and associated metadata comprising the steps of:
receiving, at a mobile device, from a backend management server, a plurality of selectable electronic metadata suggestions, wherein each of the plurality of selectable electronic metadata suggestions is preconfigured at the backend server, is not a folder location, is not a pathname, and is a textual description of an object located at a physical property;
receiving, via a mobile device, an image file;
generating, at the mobile device, file creation metadata corresponding to the creation of the image file, wherein the file creation metadata comprises an identifier associated with the device, a geographic location of the mobile device, and time metadata associated with a time the image file was created;
based on the file creation metadata, retrieving a subset of the plurality of selectable electronic metadata suggestions, wherein each of the subset of the plurality of the selectable electronic metadata suggestions does not include a particular pathname, does not include a particular folder location, and is a textual description of an object associated with a particular physical property;
displaying, on the mobile device, the subset of the plurality of selectable electronic metadata suggestions for selective association by the user with the image file;
receiving, at the mobile device, selection of a particular selectable electronic metadata suggestion for association with the image file;
embedding the particular textual description corresponding to the particular selectable electronic metadata suggestion in the image file to create a new image file;
automatically routing the new image file from the mobile device to one or more particular storage locations at a remote database based on the content metadata embedded within the new image file, wherein automatically routing the new image file comprises transferring the new image file over a network to the one or more particular storage locations without any user interaction;
automatically combining the new image file with at least one other file stored at the one or more particular storage locations to create a property inspection report; and
automatically generating a work order based on the property inspection report, wherein the work order comprises a request to manufacture, service, or repair the object at the particular physical property based on the embedded particular textual description.

11. The computer-implemented method of claim 10, wherein the image file is an image file received via a camera operatively coupled to the mobile device.

12. The computer-implemented method of claim 10, wherein the property inspection report comprises the new image file, the particular textual description, and at least one other file.

13. The computer-implemented method of claim 10, wherein the property inspection report comprises the new image file, the particular textual description, the creation metadata, and at least one other file.

14. The computer-implemented method of claim 10, further comprising the step of automatically routing the image file, the particular textual description, and the creation metadata from the mobile device to the one or more particular storage locations based on the particular textual description.

15. A computer-implemented method for processing image files comprising the steps of:
receiving, via a mobile device, a digital image file displaying a particular object at a particular physical property;
generating, at the mobile device, an identifier associated with the device, time data associated with a time the digital image file was created, and a geographic location of the mobile device;
based on the identifier associated with the device, the geographic location of the mobile device, and the time data, retrieving a plurality of textual descriptions of physical objects located at the particular physical property, wherein the textual descriptions are not pathnames or folder locations;
displaying, on the mobile device, the plurality of textual descriptions for selective association by the user with the digital image to describe the particular object displayed in the digital image;
receiving, at the mobile device, selection of a particular textual description that describes the particular object for association with the digital image;
embedding the particular textual description in the digital image to create a new image file; and
automatically routing the new image file from the mobile device to more than one storage locations at a remote database based on the particular textual description embedded within the new image file, wherein automatically routing the new image file comprises transferring the new image file over a network to the more than one particular storage locations without any user interaction.

16. The computer-implemented method of claim 15, wherein the digital image is received via a camera operatively coupled to the mobile device.

17. The computer-implemented method of claim 15, further comprising the step of automatically combining the new image file, the particular textual description, the device identifier, and the time data with at least one other file stored at the one or more particular storage locations to create a property inspection report.

18. The computer-implemented method of claim 17, further comprising the step of automatically generating a work order based on the new image file and the particular textual description, wherein the work order comprises a request to repair the particular object at the particular physical property based on the embedded particular textual description.

* * * * *